US006859573B2

(12) United States Patent
Bouevitch et al.

(10) Patent No.: US 6,859,573 B2
(45) Date of Patent: Feb. 22, 2005

(54) DOUBLE PASS ARRANGEMENT FOR A LIQUID CRYSTAL DEVICE

(75) Inventors: Oleg Bouevitch, Gloucester (CA); Paul Colbourne, Nepean (CA)

(73) Assignee: JDS Uniphase Inc., Ottawa (CA)

( * ) Notice: Subject to any disclaimer, the term of this patent is extended or adjusted under 35 U.S.C. 154(b) by 104 days.

(21) Appl. No.: 10/247,431

(22) Filed: Sep. 20, 2002

(65) Prior Publication Data

US 2003/0035605 A1 Feb. 20, 2003

Related U.S. Application Data

(63) Continuation-in-part of application No. 09/729,270, filed on Dec. 5, 2000, now Pat. No. 6,498,872.
(60) Provisional application No. 60/183,155, filed on Feb. 17, 2000, now abandoned.

(51) Int. Cl.[7] .................................................. G02B 6/26
(52) U.S. Cl. .............................. 385/16; 385/24; 385/20; 385/34; 385/36; 359/123; 359/130; 359/246; 359/247; 359/301; 359/302; 349/193; 349/196; 349/197
(58) Field of Search ................................. 349/193, 196, 349/197; 359/115, 122, 128, 130, 131, 245, 246, 247, 301, 302; 385/16, 18, 24, 31, 32, 39, 47

(56) References Cited

U.S. PATENT DOCUMENTS

| 4,367,040 A | * | 1/1983 | Goto ........................... 356/44 |
| 4,461,543 A | * | 7/1984 | McMahon ................... 359/320 |
| 4,707,056 A | * | 11/1987 | Bittner ......................... 385/31 |
| 4,839,884 A | | 6/1989 | Schloss ......................... 370/3 |
| 5,033,830 A | * | 7/1991 | Jameson ..................... 359/484 |
| 5,089,786 A | * | 2/1992 | Tamura ....................... 359/333 |
| 5,233,405 A | * | 8/1993 | Wildnauer et al. ........... 356/333 |
| 5,276,747 A | | 1/1994 | Pan ............................. 385/34 |
| 5,311,606 A | * | 5/1994 | Asakura et al. ............... 385/33 |
| 5,414,540 A | * | 5/1995 | Patel et al. .................. 349/196 |
| 5,477,350 A | * | 12/1995 | Riza et al. .................... 349/24 |
| 5,499,132 A | * | 3/1996 | Tojo et al. .................. 359/281 |

(List continued on next page.)

FOREIGN PATENT DOCUMENTS

| EP | 0 654 917 A | 4/1995 |
| EP | 0 859 249 A | 8/1999 |
| EP | 0 947 865 A | 10/1999 |
| WO | WO 99/38348 | 7/1999 |
| WO | WO 2/44800 A2 | 11/2001 ........... G02F/1/133 |

OTHER PUBLICATIONS

U.S. application Publication US2001/0050738 A1 Publication Date Dec. 13, 2001, Miller.
S.W. Knight et al., "Wavelength dependence of persistent photoconductivity in indium–doped $Pb_{1-x}Sn_xTe$", Semiconductor Science and Technology, Institute of Physics. London, GB, vol. 5, No. 3–S, Mar. 1, 1990, pp. S155–158.
Joseph F. Ford et al., "Wavelength Add–Drop Switching Using Tilting Micromirrors", Journal of Lightwave Technology, IEEE, vol. 17, No. 5, May 1999, pp. 904–911.

*Primary Examiner*—John R. Lee
*Assistant Examiner*—David A. Vanore
(74) *Attorney, Agent, or Firm*—Teitelbaum & MacLean; Neil Teitelbaum; Doug MacLean

(57) ABSTRACT

An optical device for rerouting and modifying an optical signal that uses a double pass through a liquid crystal modulator is disclosed. The optical device includes a first polarizer for providing polarized light, a liquid crystal modulator for selectively modifying the polarized light, a second polarizer for analyzing the light passed through the liquid crystal modulator, and a reflector for reflecting the analyzed light back through the second polarizer, the liquid crystal modulator, and the first polarizer. This arrangement provides a double pass through the liquid crystal modulator, thus significantly improving the attainable extinction ratio.

30 Claims, 17 Drawing Sheets

U.S. PATENT DOCUMENTS

| | | | | |
|---|---|---|---|---|
| 5,499,307 A | | 3/1996 | Iwatsuka | 385/11 |
| 5,526,155 A | * | 6/1996 | Knox et al. | 398/87 |
| 5,574,595 A | * | 11/1996 | Kurata et al. | 359/484 |
| 5,594,830 A | * | 1/1997 | Winston et al. | 385/146 |
| 5,686,979 A | * | 11/1997 | Weber et al. | 349/96 |
| 5,724,165 A | * | 3/1998 | Wu | 398/55 |
| 5,727,109 A | | 3/1998 | Pan et al. | 385/140 |
| 5,740,288 A | * | 4/1998 | Pan | 385/11 |
| 5,745,271 A | * | 4/1998 | Ford et al. | 398/87 |
| 5,771,120 A | * | 6/1998 | Bergmann | 359/484 |
| 5,847,831 A | * | 12/1998 | Tomlinson, III et al. | 356/364 |
| 5,867,264 A | | 2/1999 | Hinnrichs | 356/310 |
| 5,881,199 A | | 3/1999 | Li | 385/140 |
| 5,894,233 A | * | 4/1999 | Yoon | 327/55 |
| 5,912,748 A | * | 6/1999 | Wu et al. | 398/49 |
| 5,917,625 A | | 6/1999 | Ogusu et al. | 359/130 |
| 5,936,752 A | | 8/1999 | Bishop et al. | 359/124 |
| 5,943,158 A | * | 8/1999 | Ford et al. | 359/295 |
| 5,946,116 A | * | 8/1999 | Wu et al. | 398/55 |
| 5,960,133 A | * | 9/1999 | Tomlinson | 385/18 |
| 5,978,116 A | * | 11/1999 | Wu et al. | 398/49 |
| 5,999,672 A | | 12/1999 | Hunter et al. | 385/37 |
| 6,005,697 A | * | 12/1999 | Wu et al. | 398/48 |
| 6,018,603 A | | 1/2000 | Lundgren et al. | 385/33 |
| 6,049,367 A | * | 4/2000 | Sharp et al. | 349/117 |
| 6,055,104 A | | 4/2000 | Cheng | 359/495 |
| 6,081,331 A | | 6/2000 | Teichmann | 356/328 |
| 6,097,518 A | * | 8/2000 | Wu et al. | 398/1 |
| 6,097,859 A | | 8/2000 | Solgaard et al. | 385/17 |
| 6,118,910 A | * | 9/2000 | Chang | 385/16 |
| 6,130,013 A | * | 10/2000 | King | 430/14 |
| 6,134,031 A | * | 10/2000 | Nishi et al. | 359/15 |
| 6,134,358 A | * | 10/2000 | Wu et al. | 385/16 |
| 6,134,359 A | * | 10/2000 | Keyworth et al. | 385/33 |
| 6,175,668 B1 | * | 1/2001 | Borrelli et al. | 385/11 |
| 6,177,992 B1 | * | 1/2001 | Braun et al. | 356/327 |
| 6,181,846 B1 | * | 1/2001 | Pan | 385/18 |
| 6,192,062 B1 | * | 2/2001 | Sanchez-Rubio et al. | 372/92 |
| 6,195,479 B1 | * | 2/2001 | Pan | 385/18 |
| 6,208,442 B1 | * | 3/2001 | Liu et al. | 398/9 |
| 6,236,506 B1 | * | 5/2001 | Cao | 359/484 |
| 6,285,478 B1 | * | 9/2001 | Liu et al. | 398/9 |
| 6,285,499 B1 | * | 9/2001 | Xie et al. | 359/484 |
| 6,327,019 B1 | * | 12/2001 | Patel et al. | 349/196 |
| 6,337,934 B1 | | 1/2002 | Wu et al. | 385/16 |
| 6,360,037 B1 | | 3/2002 | Riza | 385/22 |
| 6,373,614 B1 | * | 4/2002 | Miller | 359/237 |
| 6,421,480 B2 | * | 7/2002 | Cao | 385/24 |
| 6,429,962 B1 | * | 8/2002 | Xu et al. | 359/337.1 |
| 6,452,702 B1 | * | 9/2002 | Wu et al. | 398/65 |
| 6,493,473 B1 | * | 12/2002 | Wooten | 385/11 |
| 6,498,872 B2 | * | 12/2002 | Bouevitch et al. | 385/24 |
| 2003/0113055 A1 | * | 6/2003 | Zhao et al. | 385/16 |

\* cited by examiner

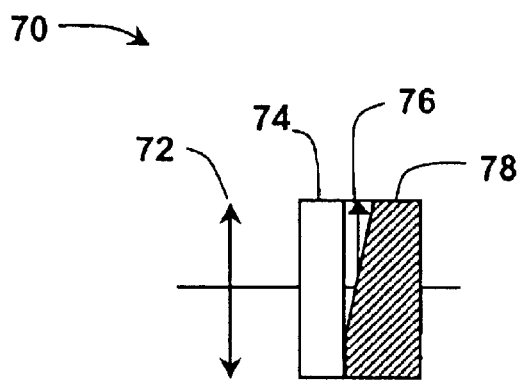
FIG. 17
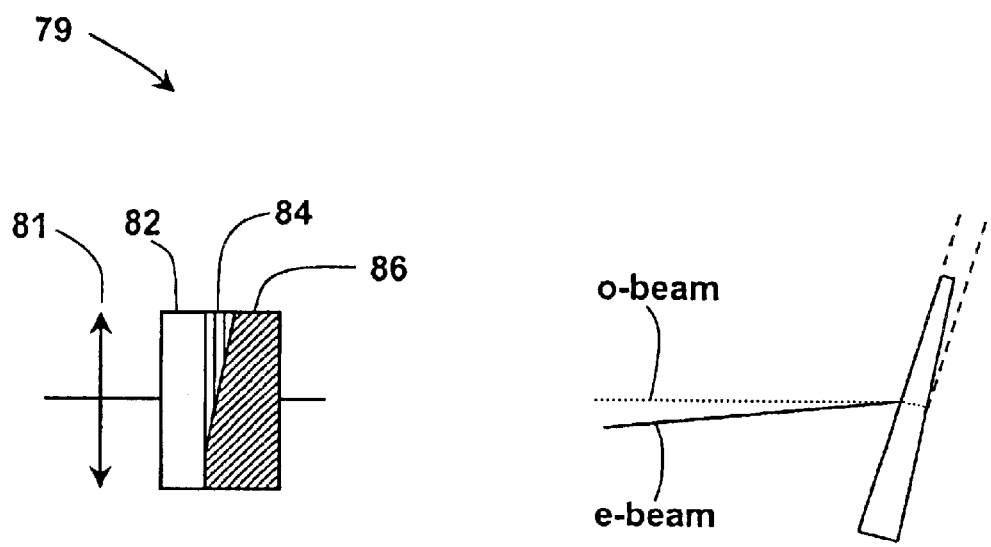
FIG. 18a
FIG. 18b

DOUBLE PASS ARRANGEMENT FOR A LIQUID CRYSTAL DEVICE

CROSS-REFERENCE TO RELATED APPLICATIONS

This application is a continuation-in-part of U.S. patent application Ser. No. 09/729,270 filed on Dec. 5, 2000 now U.S. Pat. No. 6,498,872 and claiming priority from Provisional Appl. No. 60/183,155 filed on Feb. 17, 2000 now abandoned.

FIELD OF THE INVENTION

The present invention relates to an optical device for rerouting and modifying an optical signal, or more specifically, a liquid crystal device having a double pass arrangement.

BACKGROUND OF THE INVENTION

In optical wavelength division multiplexed (WDM) communication systems, an optical waveguide simultaneously carries many different communication channels in light of different wavelengths. In WDM systems it is desirable to ensure that all channels have nearly equivalent power. To help achieve this, gain equalizers are disposed at various points throughout the system to control the relative power levels in respective channels.

Dense WDM systems require special add/drop multiplexers (ADM) to add and drop particular channels (i.e., wavelengths). For example, at predetermined nodes in the system, optical signals of predetermined wavelength are dropped from the optical waveguide and others are added.

Typically, gain equalizing and add/drop multiplexer devices involve some form of multiplexing and demultiplexing to modify each individual channel of the telecommunication signal. In particular, it is common to provide a first diffraction grating for demultiplexing the optical signal and a second spatially separated diffraction grating for multiplexing the optical signal after it has been modified. An example of the latter is disclosed in U.S. Pat. No. 5,414,540, incorporated herein by reference. However, in such instances it is necessary to provide and accurately align two matching diffraction gratings and at least two matching lenses. This is a significant limitation of prior art devices.

To overcome this limitation, other prior art devices have opted to provide a single diffraction grating that is used to demultiplex an optical single in a first pass through the optics and multiplex the optical signal in a second pass through the optics. For example, U.S. Pat. Nos. 5,233,405, 5,526,155, 5,745,271, 5,936,752 and 5,960,133, which are incorporated herein by reference, disclose such devices.

However, none of these prior art devices disclose an optical arrangement suitable for both dynamic gain equalizer (DGE) and configurable optical add/drop multiplexer (COADM) applications. In particular, none of these prior art devices recognize the advantages of providing a simple, symmetrical optical arrangement suitable for use with various switching/attenuating means.

Moreover, none of the prior art devices disclose a multiplexing/demultiplexing optical arrangement that is compact and compatible with a plurality of parallel input/output optical waveguides.

For example, U.S. Pat. No. 5,414,540 to Patel et al. discloses a liquid crystal optical switch for switching an input optical signal to selected output channels. The switch includes a diffraction grating, a liquid crystal modulator, and a polarization dispersive element. In one embodiment, Patel et al. suggest extending the 1×2 switch to a 2×2 drop-add circuit and using a reflector. However, the disclosed device is limited in that the add/drop beams of light are angularly displaced relative to the input/output beams of light. This angular displacement is disadvantageous with respect to coupling the add/drop and/or input/output beams of light into parallel optical waveguides, in addition to the additional angular alignment required for the input beam of light.

With respect to compactness, prior art devices have been limited to an excessively long and linear configurations, wherein the input beam of light passes through each optical component sequentially before being reflected in a substantially backwards direction.

U.S. Pat. No. 6,081,331 discloses an optical device that uses a concave mirror for multiple reflections as an alternative to using two lenses or a double pass through one lens. However, the device disclosed therein only accommodates a single pass through the diffraction grating and does not realize the advantages of the instant invention.

It is an object of this invention to provide an optical system including a diffraction grating that is relatively compact.

It is a further object of the instant invention to provide an optical configuration for rerouting and modifying an optical signal that can be used as a dynamic gain equalizer and/or configurable add/drop multiplexer.

It is yet a further object of the instant invention to provide an optical device that uses a liquid crystal array in a double pass arrangement.

SUMMARY OF THE INVENTION

In accordance with the invention there is provided an optical device comprising a first optical fibre for providing an input beam of light, first polarizing means for producing light having a predetermined polarization state from the input beam of light, a liquid crystal modulator positioned to receive the light having a predetermined polarization state and for selectively altering its polarization, second polarizing means positioned to receive the light transmitted from the liquid crystal modulator, said second polarization means designed for passing light having one of the predetermined polarization and a polarization perpendicular to the predetermined polarization and for blocking or diverting the other, a reflective surface positioned to receive the light passed through the second polarizing means and reflect it for a second pass through the liquid crystal modulator, a controller coupled to the liquid crystal modulator to direct the selective altering of polarization in dependence upon a desired attenuation setting for light exiting the optical device through one of the first optical fibre and a second optical fibre.

In accordance with the invention there is provided an optical device comprising an optical fibre for launching an input optical signal, a first polarizer disposed for receiving the input optical signal and for producing polarized light therefrom, a liquid crystal modulator disposed for selectively altering the polarization of the polarized light, at least one region of the liquid crystal modulator operable between a first state where the polarization of light transmitted therethrough is not rotated and a second state where the polarization of light transmitted therethrough is rotated by about 90 degrees, a second polarizer disposed for passing light transmitted from the liquid crystal modulator in dependence upon its polarization state, and a reflective element disposed for reflecting the light transmitted from the second polarizer back towards the optical fibre via the second polarizer, the liquid crystal modulator, and the first polarizer to provide an improved extinction ratio for one of the first and second states.

In accordance with the invention there is provided a variable optical attenuator comprising a birefringent element positioned to separate the optical signal into two spatially separated, orthogonally polarized beams, a liquid crystal modulator positioned to receive the polarized beams of light and to selectively alter their polarizations, a reflective element positioned to reflect the polarized beams back through the liquid crystal modulator and the birefringent element, wherein the birefringent element recombines orthogonally polarized components of the reflected beams to produce an output optical signal, and a polarizer optically disposed between the liquid crystal array and the reflective element, wherein the polarizer is positioned to contact the beams during at least one of a first pass from the liquid crystal modulator to the reflective element and a second pass from the reflective element back to the modulator.

In accordance with the invention there is further provided a liquid crystal modulator comprising a first substrate, a second substrate disposed a fixed distance from the first substrate, a layer of liquid crystal disposed between the first and second substrates, a polarizer coupled to the second substrate, and a reflective surface coupled to the polarizer for reflecting light transmitted through the first substrate, liquid crystal, second substrate, and polarizer in a backwards direction for a second pass therethrough, wherein the reflective surface is disposed at an angle relative to the second substrate.

BRIEF DESCRIPTION OF THE DRAWINGS

Exemplary embodiments of the invention will now be described in conjunction with the drawings in which:

FIG. 17 is a schematic diagram of a reflective variable optical attenuator in accordance with another embodiment of the invention including a wedged polarizer;

FIG. 18a is a schematic diagram of a reflective variable optical attenuator in accordance with another embodiment of the invention including a birefringent wedge;

FIG. 18b is a schematic diagram of the birefringent wedge depicted in FIG. 18a showing the beam deflection;

DETAILED DESCRIPTION

Figure 1:
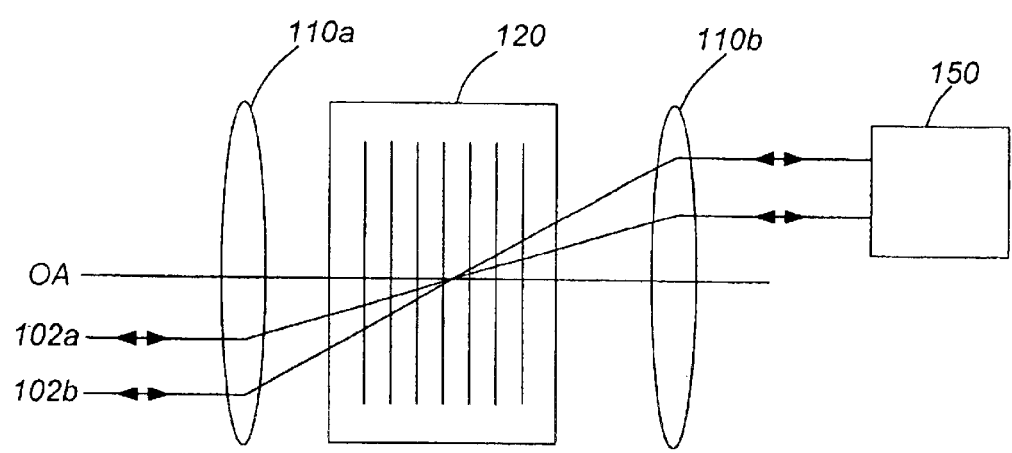
FIG. 1 is a schematic diagram illustrating an embodiment of an optical configuration that can be used as a dynamic gain equalizer and/or add-drop multiplexer (DGE/COADM) in accordance with the invention.

Referring now to FIG. 1, an optical device for rerouting and modifying an optical signal in accordance with the instant invention is shown that is capable of operating as a Dynamic Gain/Channel Equalizer (DGE) and/or a Configurable Optical Add/Drop Multiplexer (COADM).

The optical design includes a diffraction element 120 disposed between and at a focal plane of identical elements 110a and 110b having optical power, respectively. Two ports 102a and 102b are shown at an input/output end with bi-directional arrows indicating that light launched into port 102a can be transmitted through the optical device and can be reflected backward to the input port from which it was launched 102a, or alternatively, can be switched to port 102b or vice versa in a controlled manner. The input/output ports 102a and 102b are also disposed about one focal plane away from the element having optical power 110a to which they are optically coupled. Although only two input/output ports are shown to facilitate an understanding of this device, a plurality of such pairs of ports is optionally provided. At the other end of the device, modifying means 150 for modifying at least a portion of the light incident thereon is provided about the focal plane of the element having optical power 110b.

Figure 2A:
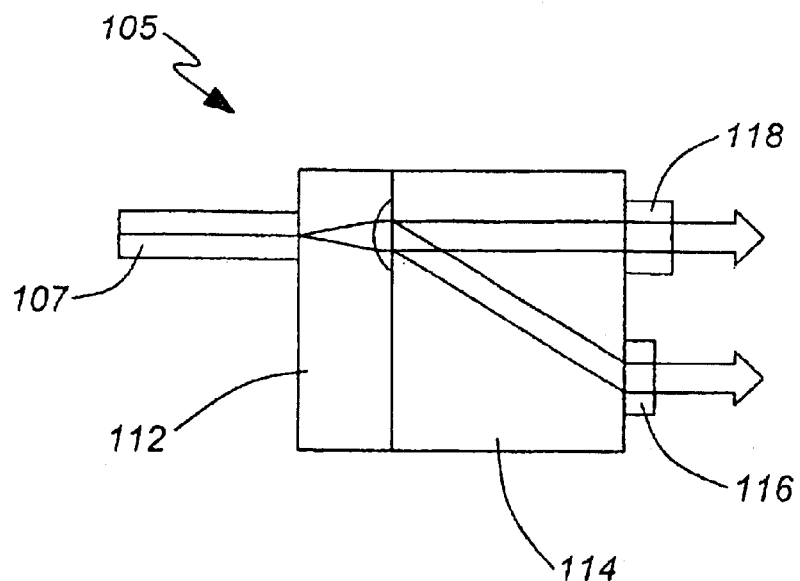
FIG. 2a is a detailed side view of a front-end module for use with the DGE/COADM shown in FIG. 1 having means for compensating for polarization mode dispersion (PMD)
Figure 2B:
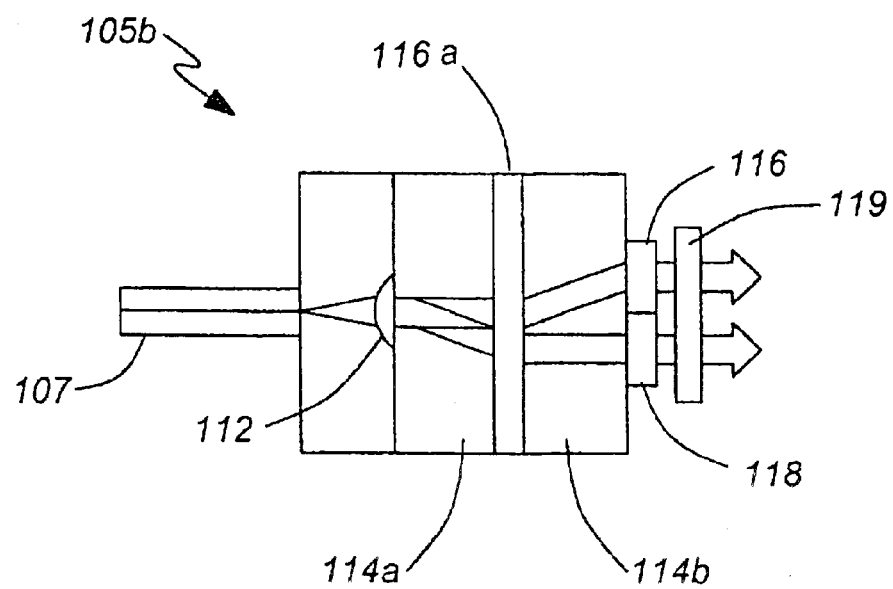
FIG. 2b is a detailed side view of an alternative front-end module having means for reducing or substantially eliminating PMD.

Since the modifying means and/or dispersive element are generally dependent upon polarization of the incident light beam, light having a known polarization state is provided to obtain the selected switching and/or attenuation. FIGS. 2a and 2b illustrate two different embodiments of polarization diversity arrangements for providing light having a known polarization state, for use with the DGE/COADM devices described herein. The polarization diversity arrangement, which is optionally an array, is optically coupled to the input and output ports.

Referring to FIG. 2a an embodiment of a front-end micro-optical component 105 for providing light having a known polarization is shown having a fibre tube 107, a microlens 112, and a birefringent element 114 for separating an input beam into two orthogonal polarized sub-beams. At an output end, a half waveplate 116 is provided to rotate the polarization of one of the beams by 90° so as to ensure both beams have a same polarization state e.g., horizontal. A glass plate or a second waveplate 118 is added to the fast axis path of the crystal 114 to lessen the effects of Polarization Mode Dispersion (PMD) induced by the difference in optical path length along the two diverging paths of crystal 114.

FIG. 2b illustrates an alternative embodiment to that of FIG. 2a, wherein two birefringent elements 114a, 114b have a half waveplate 116a disposed therebetween; here an alternate scheme is used to make the path lengths through the birefringent materials substantially similar. Optionally, a third waveplate 119 is provided for further rotating the polarization state.

Although, FIGS. 2a and 2b both illustrate a single input beam of light for ease of understanding, the front end unit 105 is capable of carrying many more beams of light therethrough, in accordance with the instant invention (i.e., can be designed as an array as described above).

FIGS. 3a–3b, 3c–3d, 4, and 5, each illustrate a different embodiment of the modifying means for use with the DGE/COADM devices described herein. Each of these embodiments is described in more detail below. Note that the modifying means are generally discussed with reference to FIG. 1. However, although reference is made to the dispersive element 120 and elements having optical power 110a and 110b, these optical components have been omitted from FIGS. 3a–3b, 3c–3d, 4, and 5 for clarity.

Figure 3A:
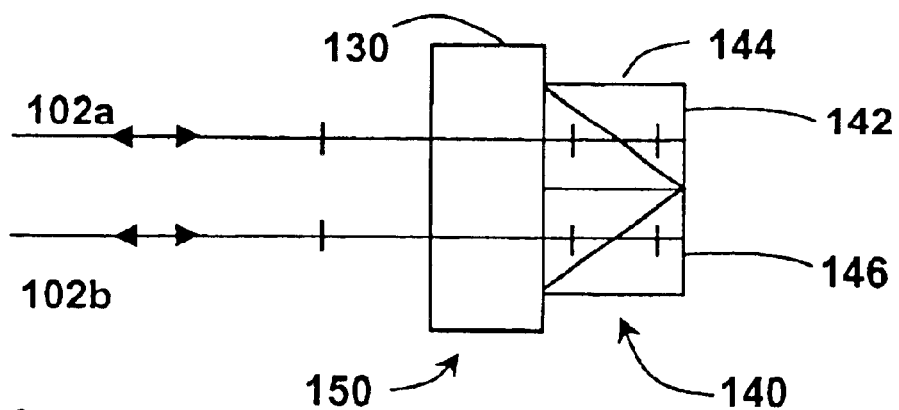
FIG. 3a is a top view of one embodiment of modifying means comprising a liquid crystal array for use with the DGE/COADM shown in FIG. 1, wherein a liquid crystal element is switched to an ON state.
Figure 3B:
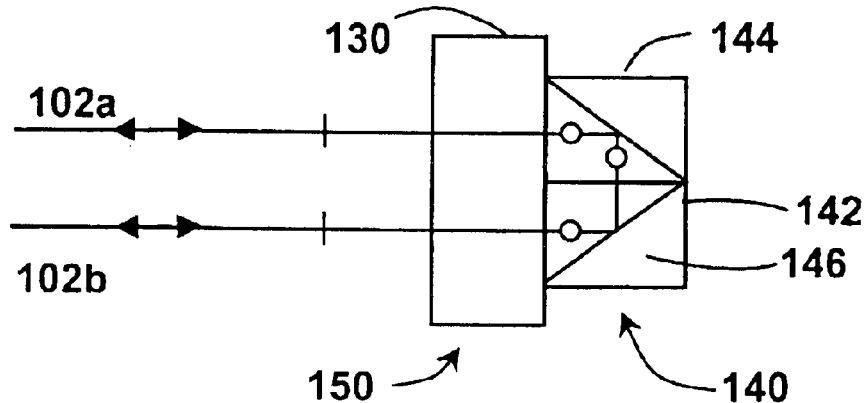
FIG. 3b is a top view of the modifying means shown in FIG. 3a, wherein the liquid crystal element is switched to an OFF state.

Referring to FIGS. 3a and 3b a schematic diagram of the modifying means 150 is shown including a liquid crystal array 130 and a reflector 140. The reflector includes first and second polarization beam splitters 144 and 146, and reflective surface 142.

When the device operates as a COADM, each pixel of the liquid crystal array 130 is switchable between a first state e.g., an "ON" state shown in FIG. 3a, wherein the polarization of a beam of light passing therethrough is unchanged (e.g., remains vertical), and a second state e.g., an "OFF" state shown in FIG. 3b, wherein the liquid crystal cell rotates the polarization of a beam of light passing therethrough 90° (e.g., is switched to horizontal). The reflector 140 is designed to pass light having a first polarization (e.g., vertical) such that beam of light launched from port 102a is reflected back to the same port, and reflect light having another polarization (e.g., horizontal) such that a beam of light launched from port 102a is switched to port 102b.

When the device operates as a DGE, each liquid crystal cell is adjusted to provide phase retardations between 0 to 180°. For a beam of light launched and received from port 102a, 0% attenuation is achieved when liquid crystal cell provides no phase retardation and 100% attenuation is achieved when the liquid crystal cell provides 180° phase retardation. Intermediate attenuation is achieved when the liquid crystal cells provide a phase retardation greater than 0 and less than 180°. In some DGE applications, the reflector 140 includes only a reflective surface 142 (i.e., no beam splitter).

Preferably, the liquid crystal array 130 has at least one row of liquid crystal cells or pixels. For example, arrays comprising 64 or 128 independently controlled pixels have been found particularly practical, but more or fewer pixels are also possible. Preferably, the liquid crystal cells are of the twisted nematic type cells, since they typically have a very small residual birefringent in the "ON" state, and consequently allow a very high contrast ratio (>35 dB) to be obtained and maintained over the wavelength and temperature range of interest. Alternatively, the liquid crystal cells are other than the twisted nematic type. Optionally, the inter-pixel areas of the liquid crystal array 130 are covered by a black grid.

Figure 3C:
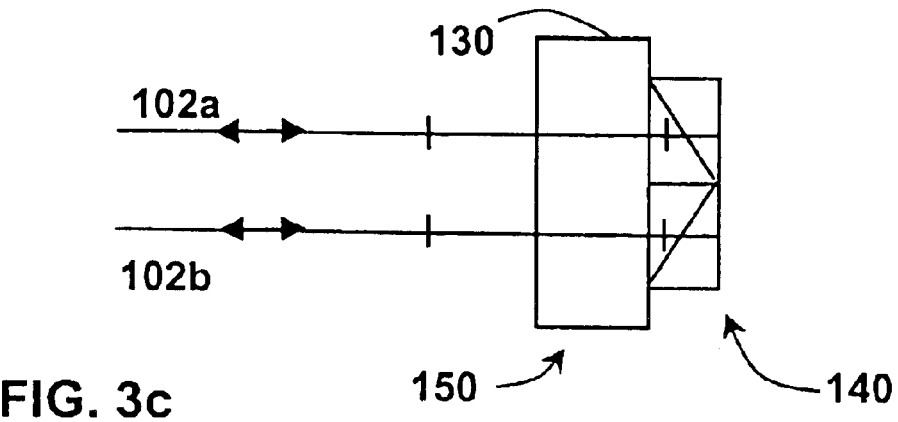
FIG. 3c is a top view of another embodiment of the modifying means for use with the DGE/COADM shown in FIG. 1, wherein the liquid crystal element is switched to an ON state.
Figure 3D:
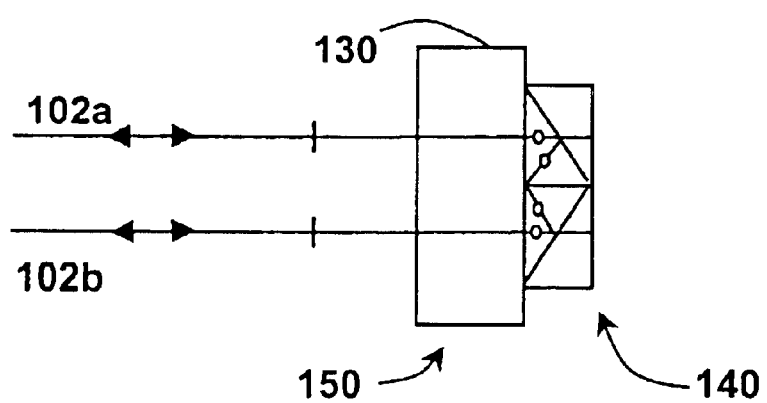
FIG. 3d is a top view of the modifying means shown in FIG. 3c, wherein the liquid crystal element is switched to an OFF state.

FIGS. 3c and 3d are schematic diagrams analogous to FIGS. 3a and 3b illustrating an alternate form of the modifying means 150 discussed above, wherein the reflector 140 includes a double Glan prism. The arrangement shown in FIGS. 3c and 3d is preferred over that illustrated in FIGS. 3a and 3b, since the respective position of the two-sub beams emerging from the polarization diversity arrangement (not shown) does not change upon switching.

Note that in FIGS. 3a–3d, the dispersion direction is perpendicular to the plane of the paper. For exemplary purposes a single ray of light is shown passing through the modifying means 150.

Figure 4A:
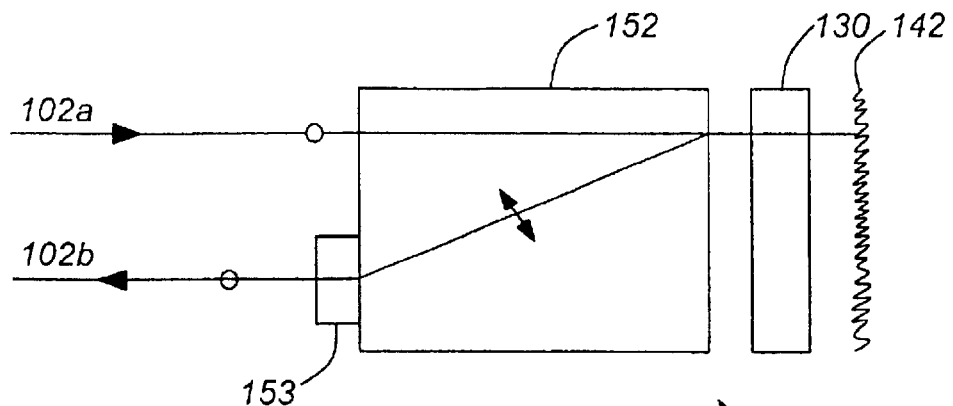
FIG. 4a is a top view of another embodiment of the modifying means for use with the DGE/COADM shown in FIG. 1 having a birefringent crystal positioned before the liquid crystal array, wherein the liquid crystal element is switched to an OFF state.
Figure 4B:
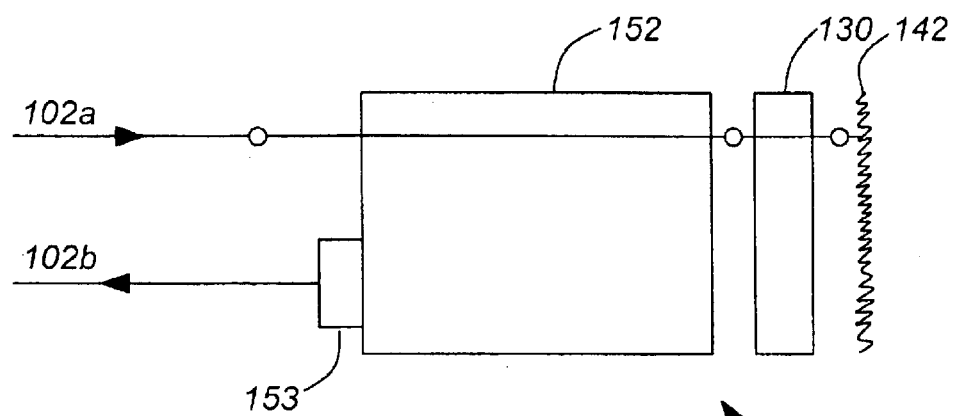
FIG. 4b is a top view of the modifying means shown in FIG. 4a, wherein the liquid crystal element is switched to an ON state.

FIGS. 4a and 4b are schematic diagrams showing another embodiment of the modifying means 150, wherein a birefringent crystal 152 is disposed before the liquid crystal array 130. A beam of light having a predetermined polarization state launched from port 102a is dispersed into sub-beams, which are passed through the birefringent crystal 152. The sub-beams of light passing through the birefringent crystal 152 remain unchanged with respect to polarization. The sub-beams of light are transmitted through the liquid crystal array 130, where they are selectively modified, and reflected back to the birefringent crystal 152 via reflective surface 142. If a particular sub-beam of light passes through a liquid crystal cell in an "OFF" state, as shown in FIG. 4a, then the polarization thereof will be rotated by 90° and the sub-beam of light will be refracted as it propagates through the birefringent crystal 152 before being transmitted to port 102b. If the sub-beam of light passes through a liquid crystal cell in an "ON" state, as shown in FIG. 4b, then the polarization thereof will not be rotated and the sub-beam of light will be transmitted directly back to port 102a. A half wave plate 153 is provided to rotate the polarization of the refracted sub-beams of light by 90° to ensure that both reflected beams of light have a same polarization state.

Figure 5:
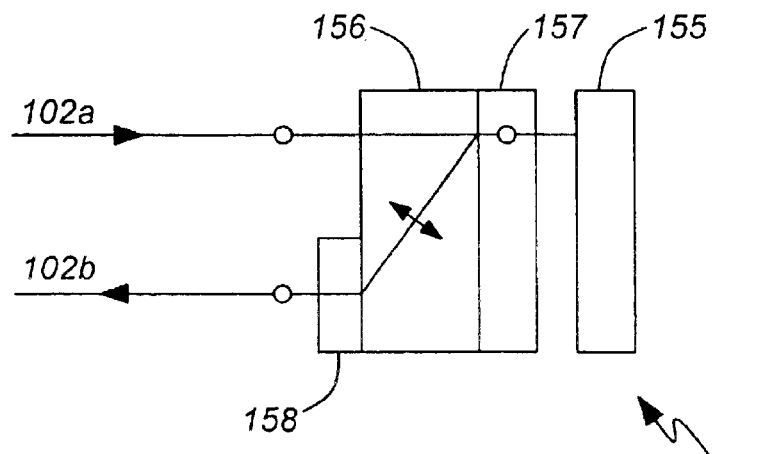
FIG. 5 is a top view of yet another embodiment of the modifying means for use with the DGE shown in FIG. 1 utilizing a MEMS device.

FIG. 5 is a schematic diagram of another embodiment of the modifying means 150 including a micro electromechanical switch (MEMS) 155, which is particularly useful when the device is used as a DGE. A beam of light having a predetermined polarization state launched from port 102a is dispersed into sub-beams and is passed through a birefringent element 156 and quarter waveplate 157. The birefringent element 156 is arranged not to affect the polarization of the sub-beam of light. After passing through the quarter waveplate 157, the beam of light becomes circularly polarized and is incident on a predetermined reflector of the MEMS array 155. The reflector reflects the sub-beam of light incident thereon back to the quarter waveplate. The degree of attenuation is based on the degree of deflection provided by the reflector (i.e., the angle of reflection). After passing through the quarter waveplate 157 for a second time, the attenuated sub-beam of light will have a polarization state that has been rotated 90° from the original polarization state. As a result the attenuated sub-beam is refracted in the birefringent element 156 and is directed out of the device to port 102b. A half wave plate 158 is provided to rotate the polarization of the refracted sub-beams of light by 90°.

Of course, other modifying means 150 including at least one optical element capable of modifying a property of at least a portion of a beam of light and reflecting the modified beam of light back in substantially the same direction from which it originated are possible.

Advantageously, each of the modifying means discussed above utilizes an arrangement wherein each spatially dispersed beam of light is incident thereon and reflected therefrom at a 90° angle. The 90° angle is measured with respect to a plane encompassing the array of modifying elements (e.g., liquid crystal cells, MEMS reflectors). Accordingly, each sub-beam of light follows a first optical path to the modifying means where it is selectively switched such that it is reflected back along the same optical path, or alternatively, along a second optical path parallel to the first. The lateral displacement of the input and modified output beams of light (i.e., as opposed to angular displacement) allows for highly efficient coupling between a plurality of input/output waveguides. For example, the instant invention is particular useful when the input and output ports are located on a same multiple bore tube, ribbon, or block.

In order to maintain the desired simplicity and symmetry, it is preferred that the element having optical power be rotationally symmetric, for example a rotationally symmetric lens or spherical reflector. Preferably, the reflector is a concave mirror. Moreover, it is preferred that the diffraction element 120 be a high efficiency, high dispersion diffraction grating. Optionally, a circulator (not shown) is optically coupled to each of ports 102a and 102b for separating input/output and/or add/drop signals.

Referring again to FIG. 1, the operation of the optical device operating as a COADM is described by way of the following example. A collimated beam of light having a predetermined polarization and carrying wavelengths $\lambda_1$, $\lambda_2$, ... $\lambda_8$ is launched through port 102a to a lower region of lens 110a an redirected to the diffraction grating 120. The beam of light is spatially dispersed (i.e., demultiplexed) according to wavelength in a direction perpendicular to the plane of the paper. The spatially dispersed beam of light is transmitted as 8 sub-beams of light corresponding to 8 different spectral channels having central wavelengths $\lambda_1$, $\lambda_2$, ... $\lambda_8$ through lens 110b, where it is collimated and incident on the modifying means 150, which for exemplary purposes, is shown in FIGS. 3a–b. Each sub-beam of light is passed through an independently controlled pixel in the liquid crystal array 130. In particular, the sub-beam of light having central wavelength $\lambda_3$ passes through a liquid crystal cell in an "OFF" state, and each of the other 7 channels having central wavelengths $\lambda_1$–$\lambda_2$ and $\lambda_4$–$\lambda_8$ pass through liquid crystal cells in an "ON" state. As the sub-beam of light having central wavelength $\lambda_3$ passes through the liquid crystal in the "OFF" state, the polarization thereof is rotated 90°, it is reflected by the polarization beam splitter 144 towards a second beam splitter 146, and is reflected back to port 102b, as shown in FIG. 3b. As the other 7 channels having central wavelengths $\lambda_1$–$\lambda_2$ and $\lambda_4$–$\lambda_8$ pass through liquid crystal cells is in an "ON" state, the polarizations thereof remain unchanged, and they are transmitted through the polarization beam splitter 144 and are reflected off reflective surface 142 back to port 102a. In summary, the beam of light originally launched from port 102a will return thereto having dropped a channel (i.e., having central wavelength $\lambda_3$) and the sub-beam of light corresponding to the channel having central wavelength $\lambda_3$ will be switched to port 102b.

Simultaneously, a second beam of light having a predetermined polarization and carrying another optical signal having a central wavelength $\lambda_3$ is launched from port 102b to a lower region of lens 110a. It is reflected from the diffraction grating 120, and is transmitted through lens 110b, where it is collimated and incident on the modifying means 150. The second beam of light passes through the liquid crystal cell in the "OFF" state, the polarization thereof is rotated 90°, it is reflected by the second polarization beam splitter 146 towards the first beam splitter 144, and is reflected back to port 102a, as shown in FIG. 3b. Notably, the 7 express channels and the added channel are multiplexed when they return via the dispersion grating 120.

Since every spectral channel is passed through an independently controlled pixel before being reflected back along one of the two possible optical paths, a full reconfigurablility of plurality of channels is obtained.

Notably, the choice of eight channels is arbitrarily chosen for exemplary purposes. More or fewer channels are also within the scope of the instant invention.

Referring again to FIG. 1, the operation of the optical device operating as a DGE is described by way of the following example. A collimated beam of light having a predetermined polarization and carrying channels $\lambda_1$, $\lambda_2$, . . . $\lambda_8$ is launched from port 102a through lens 110a, where it is redirect diffraction grating 120. The beam of light is spatially dispersed according to wavelength in a direction perpendicular to the plane of the paper. The spatially dispersed beam of light is transmitted as 8 sub-beams of light corresponding to 8 different spectral channels having central wavelengths $\lambda_1$, $\lambda_2$, . . . $\lambda_8$ through lens 110b, where it is collimated and incident on the modifying means 150 such that each sub-beam of light is passed through an independently controlled pixel in the liquid crystal array 130 wherein the polarization of each sub-beam of light is selectively adjusted. In particular, the sub-beam of light having central wavelength $\lambda_3$ is passed through a liquid crystal cell in an "ON" state, the polarization thereof is not adjusted, it passes through the beam splitter 144, and is reflected back to port 102a with no attenuation, as illustrated in FIG. 3a. Simultaneously, a sub-beam of light having central wavelength $\lambda_4$ is passed through a liquid crystal cell in an "OFF" state, the polarization thereof is rotated by 90°, it is reflected from beam splitters 144 and 146 and is directed to port 102b. 100% attenuation is achieved with respect to this sub-beam of light returning to port 102a. Simultaneously, a sub-beam of light having central wavelength $\lambda_5$ is passed through a liquid crystal cell that provides phase retardation between 0 and 180°, it is partially transmitted through from beam splitter 144 and returns to port 102a an attenuated signal. The degree of attenuation is dependent upon the phase retardation.

Optionally, a second beam of light is simultaneously launched from port 102b into the optical device for appropriate attenuation. In fact, this optical arrangement provides a single optical system that is capable of providing simultaneous attenuation for a plurality of input ports, e.g., 102c, 102d, 102e, etc . . . (not shown).

Alternatively, the attenuated light is received from port 102b, hence obviating the need for a circulator. In this instance, when the polarization of a beam of light having central wavelength $\lambda_3$ is rotated by 90° (i.e., the liquid crystal array provides 180° phase retardation), it is reflected from the beam splitter 144 to the second beam splitter 146 (shown in FIG. 3a) and is directed to port 102b with no attenuation. Similarly, when the polarization of this beam of light is not adjusted (i.e., the liquid crystal array provides no phase retardation), it passes through the beam splitter 144 (shown in FIG. 3a) and is reflected back to port 102a. 100% attenuation with respect to this sub-beam of light reaching port 102b is achieved. Variable attenuation is achieved when the liquid crystal cell selectively provides phase retardation between 0 and 180°.

Figure 6A:
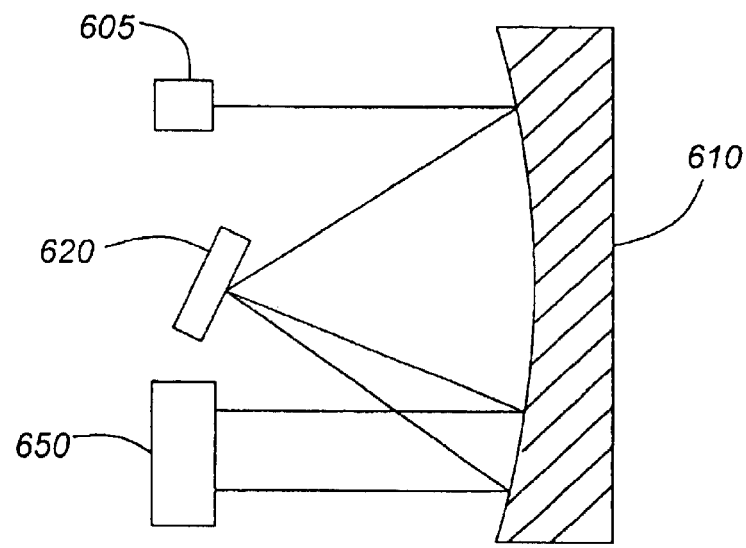
FIGS. 6a and 6b are schematic diagrams of an embodiment of the invention that is preferred over the one shown in FIG. 1, wherein the focal plane of a single concave reflector is used to locate the input/output ports, diffraction grating, and modifying means.

Turning now to FIG. 6a another embodiment of the DGE/COADM which is preferred over the embodiment shown in FIG. 1, is shown. For clarity, only one beam is shown exiting the front-end unit 605, however at least one other beam (not shown) is disposed behind this beam as is evident in the isometric view illustrated in FIG. 6b.

In FIG. 6a a single element having optical power in the form of a concave reflector, such as spherical mirror 610, is used to receive a collimated beam of light from the front-end unit 605 and to receive and reflect beams of light to and from the diffraction grating 620 and the modifying means 650. The front-end unit 605, the diffraction grating 620, and the modifying means 650, are similar to parts 105, 120, and 150 described above. However, in this embodiment the front-end unit 605, the diffraction grating 620, and the modifying means are each disposed about the single focal plane of the spherical reflector 610. Preferably, the diffraction grating is further disposed about the optical axis of the spherical reflector 610. In general, two circulators (not shown) are optically coupled to the front-end unit 605 to separate input/out and add/drop signals in ports 102a and 102b, as described above.

Figure 6B:
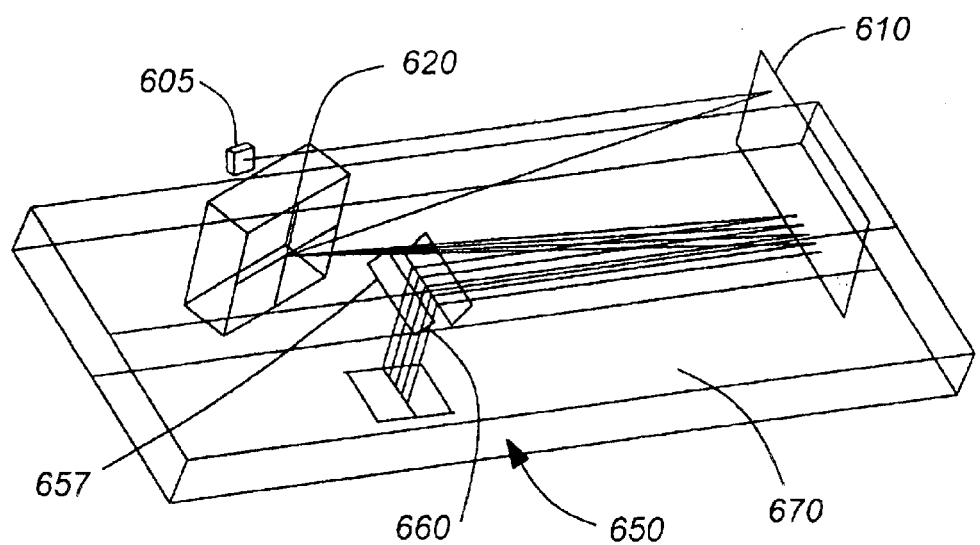

Preferably, the diffraction grating 620, the spherical reflector 640, and the modifying means 650 are each made of fused silica and mounted together with a beam folding mirror or prism 660 to a supporting plate 670 made of the same, as illustrated in FIG. 6b. The beam folding mirror or prism 660 is provided for space considerations. Advantageously, this design provides stability with respect to small temperature fluctuations. Moreover, this design is defocus free since the radius of curvature of the spherical reflector 610 changes in proportion to thermal expansion or contraction of any other linear dimensions. Advantageously, the spherical minor 610 has substantially no chromatic aberrations.

When the optical device operates as a DGE, a detector array 657 is optionally positioned behind the beam-folding mirror 660 to intercept part of the wavelength dispersed beam of light. This design allows the signal to be tapped while eliminating the need for external feedback.

Preferably, the diffraction grating 620 and the modifying means 650 are disposed substantially one focal length away from the spherical mirror 610 or substantially at the focal plane of the spherical reflector 610, as discussed above. For example, in COADM applications it is preferred that the modifying means 650 are substantially at the focal plane to within 10% of the focal length. For DGE applications, it is preferred that the modifying means 650 are substantially at the focal plane to within 10% of the focal length if a higher spectral resolution is required, however, the same accuracy is not necessary for lower resolution applications.

In operation, a multiplexed beam of light is launched into the front-end unit 605. The polarization diversity arrangement 105 provides two substantially collimated sub-beams of light having the same polarization (e.g., horizontal), as discussed above. The two beams of light are transmitted to the spherical reflector 610 and are reflected therefrom towards the diffraction grating 620. The diffraction grating 620 separates each of the two sub-beams into a plurality of sub-beams of light having different central wavelengths. The plurality of sub-beams of light are transmitted to the spherical reflector 610 where they are collimated and transmitted to the modifying means 150 where they are incident thereon as spatially separated spots corresponding to individual spectral channels. Each sub-beam of light corresponding to an individual spectral channel is modified and reflected backwards either along the same optical path or another optical path according to its polarization state, as described above. The sub-beams of light are transmitted back to the spherical reflector 610 and are redirected to the dispersive element, where they are recombined and transmitted back to the spherical element to be transmitted to the predetermined input/output port.

Optionally, second, third, forth, . . . etc. multiplexed beams of light are launched into the front-end unit 605. In fact, this optical arrangement is particularly useful for applications requiring the manipulation of two bands (e.g., C and L bands), simultaneously, wherein each band has its own corresponding in/out/add/drop ports.

Advantageously, the optical arrangement shown in FIGS. 6a and 6b provides a symmetrical 4-$f$ optical system with fewer alignment problems and less loss than prior art systems. In fact, many of the advantages of this design versus a conventional 4f system using separate lenses is afforded due to the fact that the critical matching of components is obviated. One significant advantage relates to the fact that the angle of incidence on the grating, in the first and second pass, is inherently matched with the optical arrangement.

The instant invention further provides an optical device for rerouting and modifying an optical signal device that is substantially more compact and that uses substantially fewer components than similar prior art devices.

Figure 7:
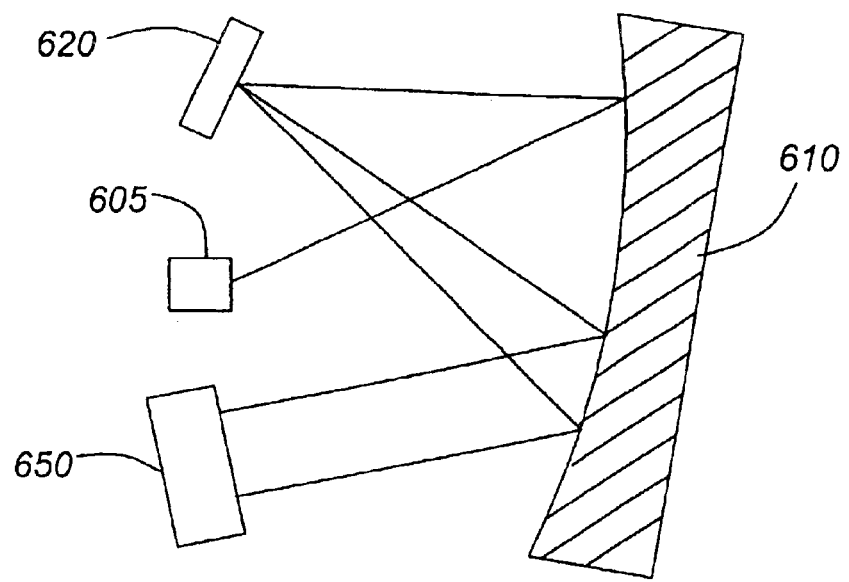
FIG. 7 is a schematic diagram of an embodiment of the invention that is similar to that shown in FIGS. 6a and 6b, wherein the input/output ports are disposed between the modifying means and dispersive element.

FIG. 7 shows an alternate arrangement of FIG. 6a and FIG. 6b that is particularly compact. In this embodiment, the more bulky dispersive element 620 and modifying means 650 are disposed outwardly from the narrower front-end unit 605.

Figure 8:
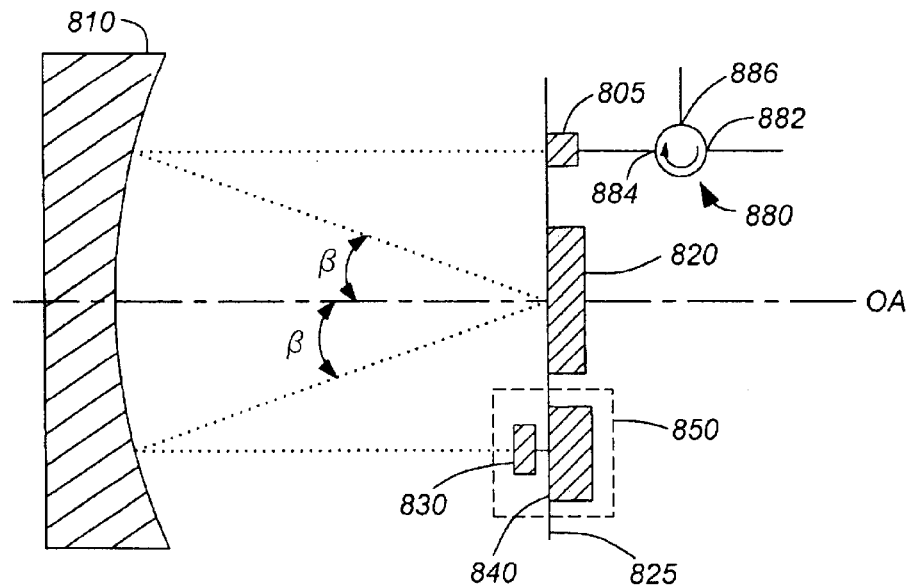
FIG. 8 is a schematic diagram of a DGE having a configuration similar to that shown in FIGS. 6a and 6b including an optical circulator.

FIG. 8 illustrates a DGE including a conventional three port optical circulator and having a particularly symmetrical design. A beam of light is launched into a first port 882 of the circulator 880 where it circulates to and exits through port 884. The beam of light exiting port 884 is passed through the front-end unit 805, which produces two collimated sub-beams having a same polarization that are transmitted to an upper region of the spherical reflector 810 in a direction parallel to an optical axis OA thereof. The collimated sub-beams of light incident on the spherical reflector 810 are reflected and redirected to the diffraction grating 820 with an angle of incidence β. The sub-beams of light are spatially dispersed according to wavelength and are transmitted to a lower region of the spherical reflector 810. The spatially dispersed sub-beams of light incident on the lower region of the spherical reflector 810 are reflected and transmitted to the modifying means 850 in a direction parallel to the optical axis of the spherical reflector 810. Once attenuated, the sub-beams of light are reflected back to the spherical reflector 810, the diffraction grating 820, and the front-end unit 805 along the same optical path. The diffraction grating recombines the two spatially dispersed sub-beams of light. The front-end unit 805 recombines the two sub-beams of light into a single beam of light, which is transmitted to the circulator 880 where it is circulated to output port 886. The front-end unit 805, diffraction grating 820, and modifying means 850, which are similar to components 105, 120, and 150 described above, are each disposed about a focal plane 825 of the spherical reflector 810. In particular, the diffraction grating 820 is disposed about the focal point of the spherical reflector 810 and the modifying means 850 and front-end unit are symmetrically disposed about the diffraction grating. Preferably, the modifying means 850 includes either a liquid crystal array 830 and a flat reflector 840, or a MEMS array (not shown).

Notably, an important aspect of the optical design described heretofore relates to the symmetry and placement of the optical components. In particular, the fact that each of the front-end unit, the element having optical power, the dispersive element, and the modifying means are disposed about one focal length (of the element having optical power) away from each other is particularly advantageous with respect to the approximately Gaussian nature of the incident beam of light.

Referring again to FIG. 8, the input beam of light emerges from the front-end unit 805 essentially collimated and is transmitted via the element having optical power 810 to the diffraction grating 820. Since the diffraction grating 820 is located at the focus of the element having optical power 810 and the input beams are collimated, the light is essentially focused on the diffraction grating 820, as discussed above.

The $1/e^2$ spot size at the grating, $2\omega_1$, and the $1/e^2$ diameter $2\omega_2$ at the front-end unit 805, are related by:

$$\omega_1 * \omega_2 = \lambda * f/\pi$$

where λ is wavelength and f is the focal length of the element having optical power. Accordingly, one skilled in the art can tune the spot size on the diffraction grating 820 and the resulting spectral resolution by changing the beam size at the front-end unit 805.

Moreover, the instant invention allows light beams launched from the front-end unit 805 to propagate to the liquid crystal array 830 with little or no spot expansion, since by symmetry, the spot size at the liquid crystal array is the same as the spot size at the front-end unit. Accordingly, the size of a beam of light launched from the front-end unit 805 can be changed to conform to the cell size of the liquid crystal array and/or vice versa. Alternatively, the size of the beam of light can be adjusted to change the spot size on the grating element 820, as discussed above. Obviously, the same tuning is achievable with the optical arrangements shown in both FIG. 1 and FIGS. 6a, 6b.

Figure 9:
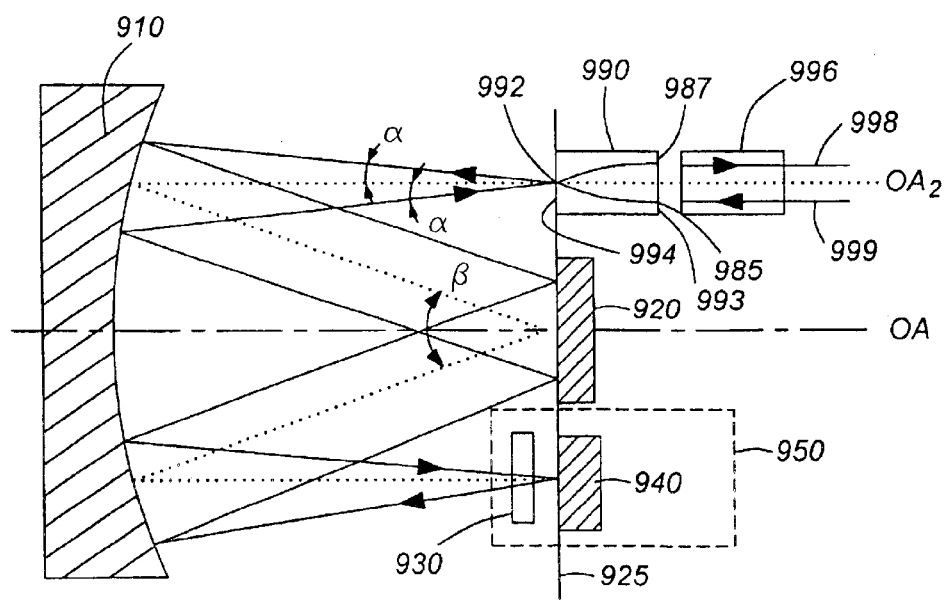
FIG. 9 is a schematic diagram of a DGE/COADM in accordance with the instant invention including a lens having a single port for launching and receiving light from the concave reflector.

FIG. 9 illustrates an embodiment in accordance with the instant invention, wherein a single collimating/focusing lens 990 replaces the optical circulator 884 in the DGE shown in FIG. 8. Preferably, the lens 990 is a collimating/focusing lens such as a Graded Index or GRIN lens. The GRIN lens 990 is disposed such that an end face 994 thereof is coincident with the focal plane 925 of the spherical reflector 910. The GRIN lens 990 is oriented such that its optical axis ($OA_2$) is parallel to but not coaxial with the optical axis OA of the spherical reflector 990. Input 985 and output 987 ports are disposed about an opposite end face 993 of the lens 990, off the optical axis $OA_2$, and are optically coupled to input 999 and output 998 optical waveguides, respectively. Preferably, input 999 and output 998 waveguides are optical fibres supported by a double fibre tube, such as a double bore tube or a double v-groove tube. A single input/output port 992 is disposed about end face 994 coincident with the optical axis $OA_2$. The modifying means 950 are shown including a liquid crystal array 930 and a flat mirror 940 perpendicular to the OA of the spherical reflector 910. Alternatively, the modifying means comprises a MEMS array (not shown). All other optical components are similar to those described with reference to FIG. 8.

In operation, a beam of light is launched from input waveguide 999 into port 985 in a direction substantially parallel to the optical axis ($OA_2$) of the lens 990. The beam of light passes through the GRIN lens 990, and emerges from port 992 at an angle α to the optical axis. The angle α is dependent upon the displacement of port 985 from the optical axis ($OA_2$), d. The beam of light is transmitted to an upper end of the spherical reflector 910, where it is directed to the diffraction grating 920 with an angle of incidence β. The resulting spatially dispersed beam of light is transmitted to the spherical reflector, is reflected, and is transmitted to the modifying means 950. If the diffraction grating 920 is parallel to the focal plane 925, as shown in FIG. 9, the beam of light incident on the modifying means has an angle of incidence substantially close to α. Each sub-beam of the spatially dispersed beam of light is selectively reflected back to the spherical reflector 910 at a predetermined angle, generally along a different optical path from which it came. Variable attenuation is provided by the modifying means 950. The spherical reflector 910 redirects the modified spatially dispersed beam of light back to the diffraction grating 920 such that it is recombined to form a single modified output beam of light, which is incident on the single port 992 with an angle of incidence close to −α. The attenuated output beam of light is passed through the lens 990, and is directed towards output port 987 where it is transmitted to output optical fibre 998.

Advantageously, this simple device, which allows light to enter and exit through two different ports disposed at one end of the device, is simple, compact, and easy to manufacture relative to prior art modifying and rerouting devices.

Moreover, the instant design obviates the need for a bulky and costly optical circulator, while simultaneously providing an additional degree of freedom to adjust the mode size, which in part defines the resolution of the device (i.e., can adjust the focal length of GRIN lens 990).

Preferably, light transmitted to and from the output 998 and input 999 optical waveguides is focussed/collimated, e.g., through the use of microcollimators, thermally expanded core fibres, or lens fibres. Optionally, a front-end unit (e.g., as shown in FIG. 2a or 2b), which is in the form of an array, couples input/output waveguides 999/998 to end face 993. FIGS. 9a–9d illustrate various optical input arrangements, which for exemplary purposes are illustrated with the arrangement shown in FIG. 2a.

Figure 9A:
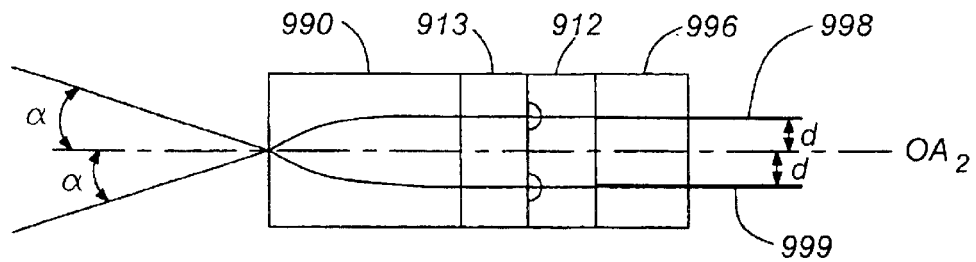
FIG. 9a is a top view showing a lenslet array coupling input/output optical waveguides to the lens in accordance with the instant invention.

In FIG. 9a, the input 999 and output 998 optical fibres are coupled to the GRIN lens 990 via a lenslet array 912. A spacer 913 is provided in accordance with the preferred telecentric configuration. This optical arrangement, which does not provide polarization diversity, is suitable for applications that do not involve polarization sensitive components.

Figure 9B:
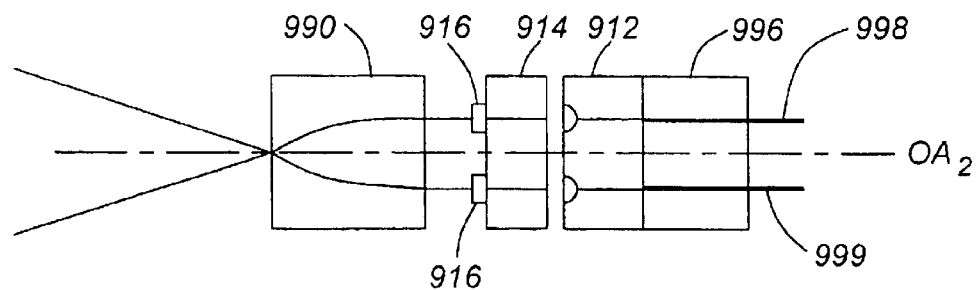
FIG. 9b is a top view showing a prior art polarization diversity arrangement coupling input/output optical waveguides to the lens in accordance with the instant invention.
Figure 9C:
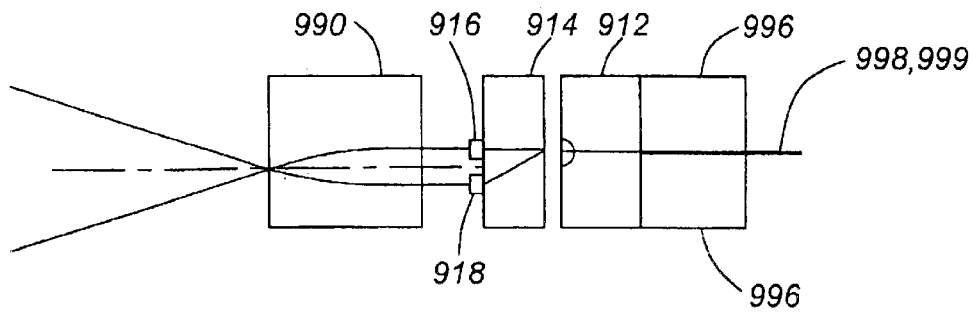
FIG. 9c is a side view of the prior art polarization diversity arrangement shown in FIG. 9b.

FIGS. 9b and 9c depict top and side views of the embodiment where a front-end unit (i.e., as shown in FIG. 2a), couples the input/output waveguides 999/998 to the GRIN lens 990. More specifically, the front-end unit includes sleeve 996, lenslet array 912, birefringent element 914, half waveplates 916, glass plates or second waveplates 918, and GRIN lens 990.

Figure 9D:
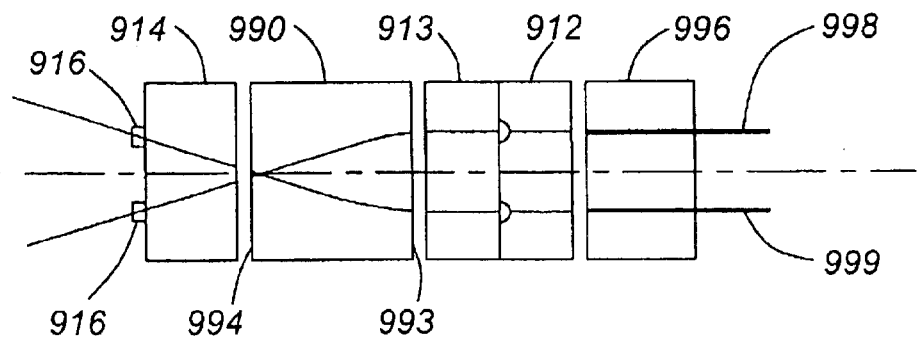
FIG. 9d is a top view showing an alternative arrangement to the optical components shown in FIG. 9b.
Figure 9E:
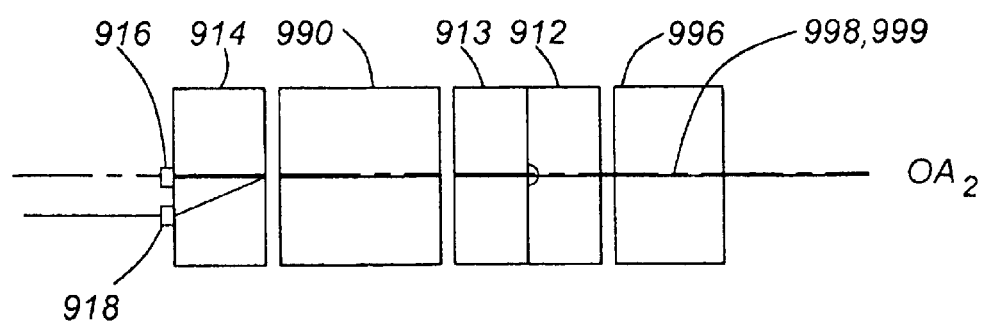
FIG. 9e is a side view of the alternate arrangement shown in FIG. 9d.

In FIGS. 9d and 9e there is shown top and side views of an arrangement wherein the birefringent element 914, half waveplates 916, and glass plates 918, which provide the polarization diversity, are disposed about end face 994 of GRIN lens 990 and a spacer 913 the lenslet array 112 are disposed about end face 993.

Figure 9F:
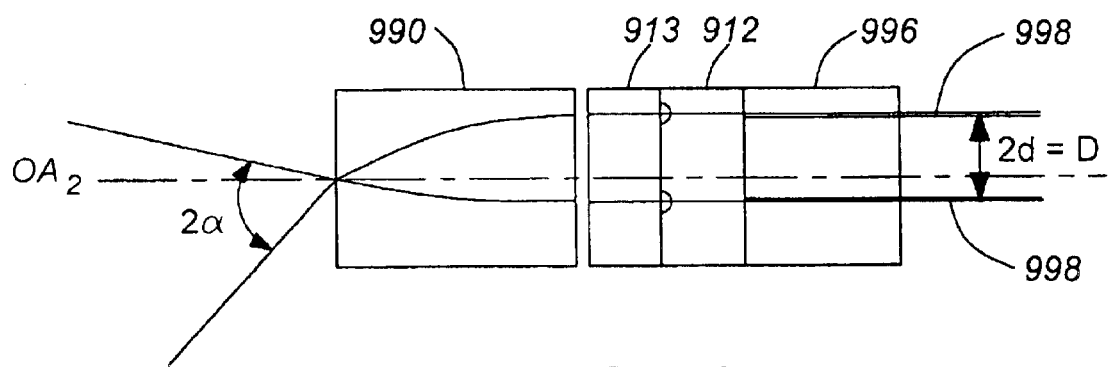
FIG. 9f is a top view showing an asymmetric offset of the input/output optical waveguides with respect to the optical axis of the lens, in accordance with the instant invention.

FIG. 9f illustrates an embodiment wherein the input 999 and output 998 optical waveguides are not symmetrically disposed about the optical axis $OA_2$ of the GRIN lens 990. In these instances, it is more convenient to compare the fixed distance between the input 999 and output 998 waveguides (D=2d) to the total angle between the input and output optical paths (2α). More specifically, the relationship is given approximately as:

$$\frac{D}{F} = 2\alpha$$

where F is the focal length of the GRIN lens 990.

Figure 10:
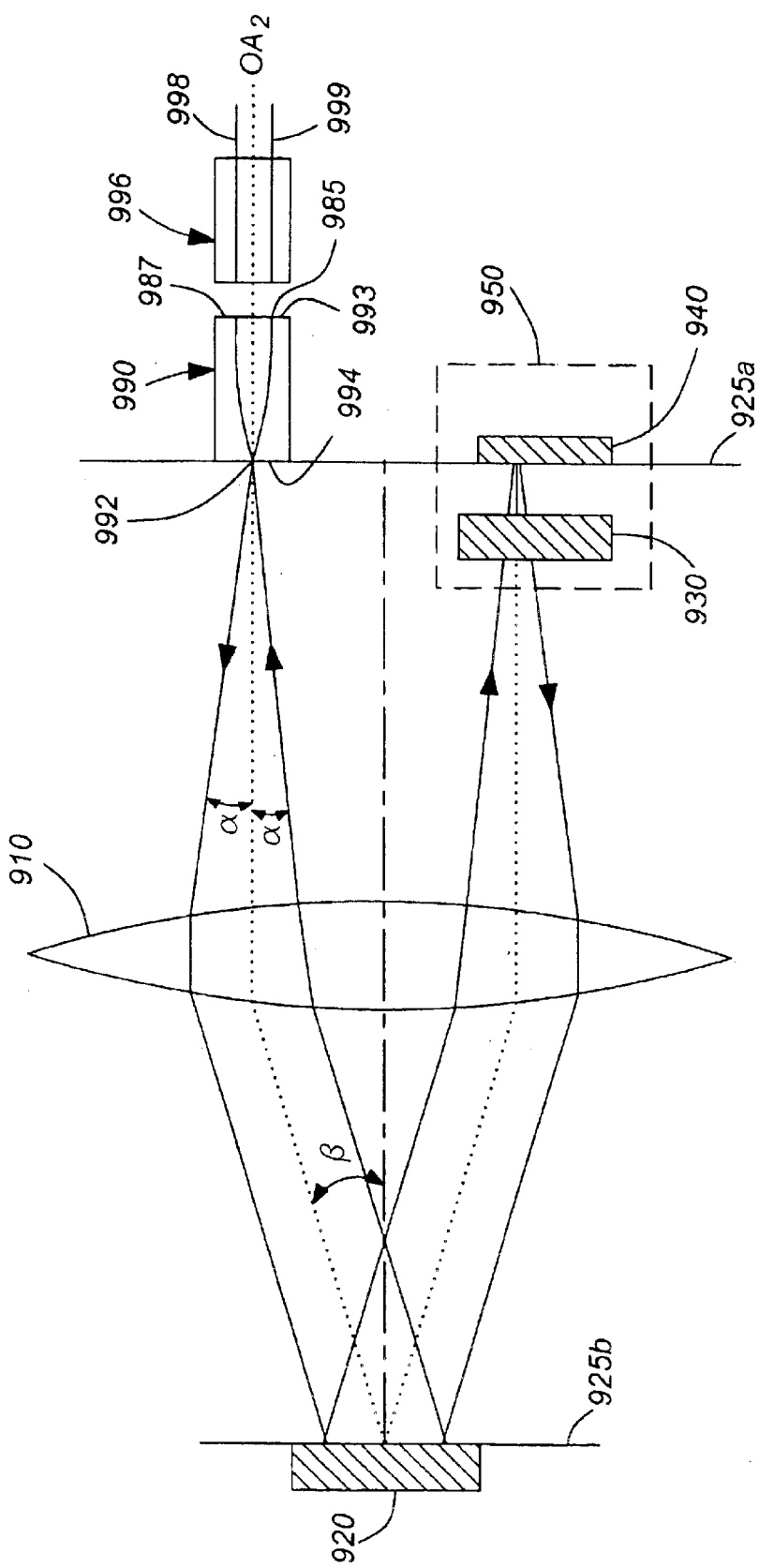
FIG. 10 is a schematic diagram of another embodiment of a DGE/COADM in accordance with the invention.

Of course other variations in the optical arrangement are possible. For example, in some instances, it is preferred that the diffraction grating 920 is disposed at an angle to the focal plane 925. In addition, the placement of the front end unit/lens 990, diffraction grating 920, and modifying means 950 can be selected to minimize aberrations associated with the periphery of the element having optical power 910. In FIG. 10, an alternative design of FIG. 9, wherein the element having optical power is a lens 910 having two focal planes, 925a and 925b is illustrated. The diffraction grating 920 is coincident with focal plane 925b and the reflector 940 is coincident with focal plane 925a. The operation is similar to that discussed for FIG. 9.

An advantage of the embodiments including a GRIN lens 990, e.g. as shown in FIG. 9–9d is that they are compatible with modifying means based on MEMS technology, for both COADM and DGE applications. This is in contrast to the prior art optical arrangements described in FIGS. 1 and 6–8, wherein the MEMS based modifying means 150 are preferred for DGE applications over COADM applications.

In particular, when the single collimating/focusing lens 990 provides the input beam of light and receives the modified output beam of light, the angular displacement provided by each MEMS reflector complements the angular displacement resulting from the use of the off-axis input/output port(s) on the GRIN lens 990. More specifically, the angular displacement provided by the lens 990 e.g., α, is chosen in dependence upon the angular displacement of the MEMS device, e.g., 1°.

Figure 11:
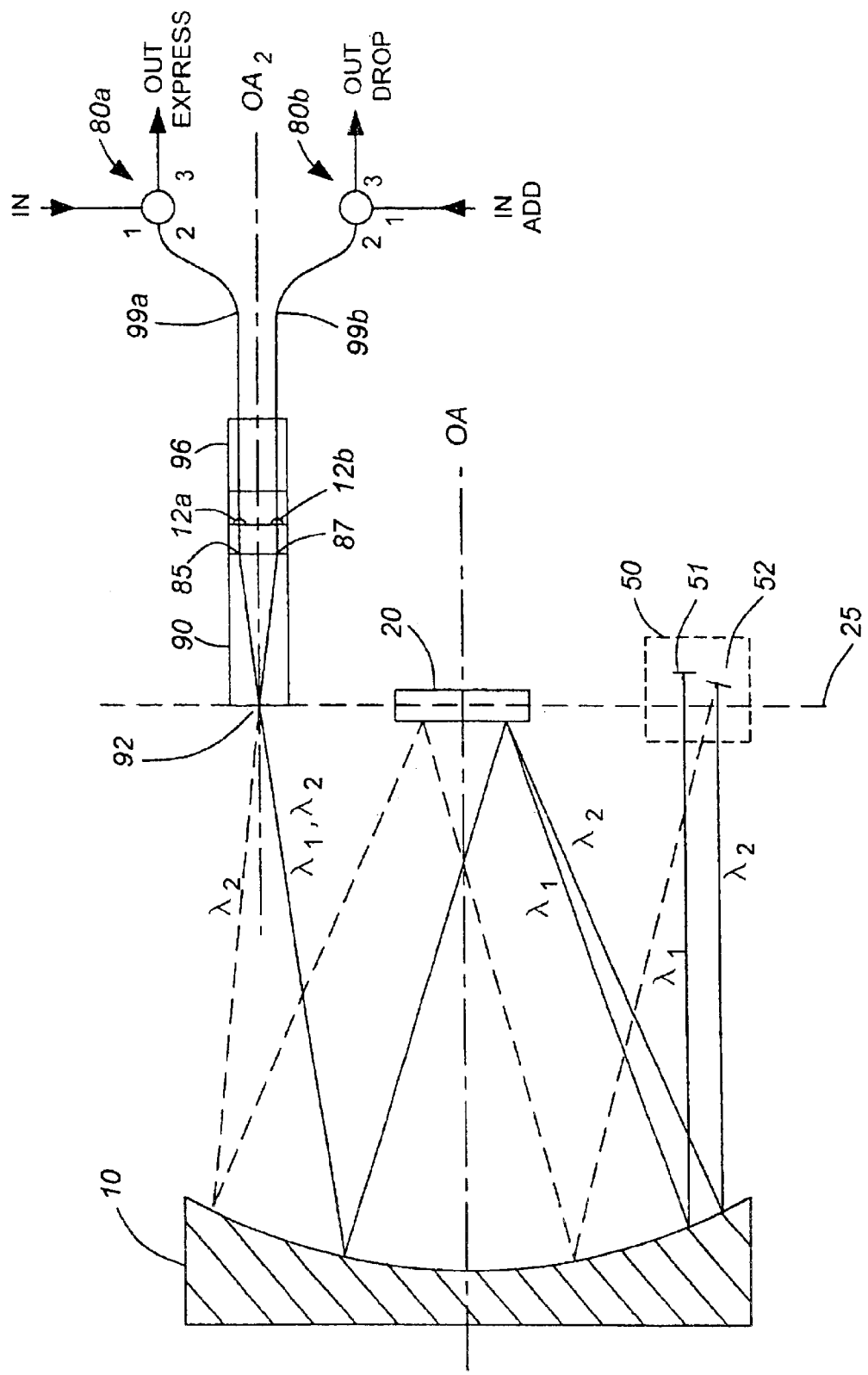
FIG. 11 is a schematic diagram of the preferred embodiment of a COADM in accordance with the instant invention.

A preferred embodiment is illustrated in FIG. 11, wherein an arrangement similar to that shown in FIG. 9 designed to operate as a COADM, is shown. Optical circulators 80a and 80b are coupled to each of the optical waveguides 99a and 99b, respectively, for separating in/out and add/drop optical signals. Optical waveguides 99a and 99b are optically coupled to microlenses 12a and 12b disposed on one side of the lens 90. The lens 90 is disposed such that an end thereof lies in the focal plane 25 of the spherical reflector 10. Also in the focal plane are the dispersive element 20 and the modifying means 50, as described above. However, in this embodiment, the modifying means is preferably a MEMS array 50. Notably, the MEMS array provides a 2×2 bypass configuration wherein an express signal launched into port 1 of the circulator 80a propagates to port 3 of the same circulator 80a in a first mode of operation and a dropped signal launched into port one of the circulator 80a propagates to port 3 of the second circulator 80b in a second mode of operation. Similarly, a signal added at port 1 of the second circulator device propagates to port 3 of the first circulator in the second mode of operation and is not collected in the first mode of operation. For exemplary purposes, the beam of light is assumed to include wavelengths $\lambda_1$ and $\lambda_2$, however, in practice more wavelengths are typically used.

In operation, the beam of light carrying wavelengths $\lambda_1$ and $\lambda_2$, is launched into port 1 of the first optical circulator 80a and is circulated to optical waveguide 99a supported by sleeve 96. The beam of light is transmitted through the microlens 12a to the lens 90, in a direction substantially parallel to the optical axis ($OA_2$) of the lens 90. The beam of light enters the lens through port 85 disposed off the optical axis ($OA_2$) and emerges from port 92 coincident with the optical axis ($OA_2$) at an angle to the optical axis ($OA_2$). The emerging beam of light $\lambda_1\lambda_2$, is transmitted to an upper portion of the spherical reflector 10, is reflected, and is incident on the diffraction grating 20, where it is spatially dispersed into two sub-beams of light carrying wavelengths $\lambda_1$ and $\lambda_2$, respectively. Each sub-beam of light is transmitted to a lower portion of the spherical reflector 10, is reflected, and is transmitted to separate reflectors 51 and 52 of the MEMS array 50. Referring to FIG. 11, reflector 51 is oriented such that the sub-beam of light corresponding to $\lambda_1$ incident thereon, is reflected back along the same optical path to the lens 90, passes through port 85 again, and propagates to port 2 of circulator 80a where it is circulated to port 3. Reflector 52, however, is oriented such that the sub-beam of light corresponding to $\lambda_2$ is reflected back along a different optical path. Accordingly, the dropped signal corresponding to wavelength $\lambda_2$ is returned to the lens 90, passes through port 87, propagates to port 2 of the second circulator 80b, and is circulated to port 3.

Simultaneously, a second beam of light having central wavelength $\lambda_2$ is added into port 1 of the second optical circulator 80b and is circulated to optical waveguide 99b. The second beam of light $\lambda_2$ is transmitted through the microlens 12b to the lens 90, in a direction substantially parallel to the optical axis (OA$_2$) of the lens 90. It enters the lens 90 through port 87 disposed off the optical axis (OA$_2$) and emerges from port 92 coincident with the optical axis (OA$_2$) at an angle to the optical axis. The emerging beam of light is transmitted to an upper portion of the spherical reflector 10, is reflected, and is incident on the diffraction grating 20, where it is reflected to reflector 52 of the MEMS array 50. Reflector 52 is oriented such that the second beam of light corresponding to $\lambda_2$ is reflected back along a different optical path to the spherical reflector 10, where it is directed to the diffraction grating. At the diffraction grating, the added optical signal corresponding to $\lambda_2$ is combined with the express signal corresponding to $\lambda_1$. The multiplexed signal is returned to the lens 90, passes through port 85, and returns to port 2 of the first circulator 80a where it is circulated out of the device from port 3.

Figure 12:
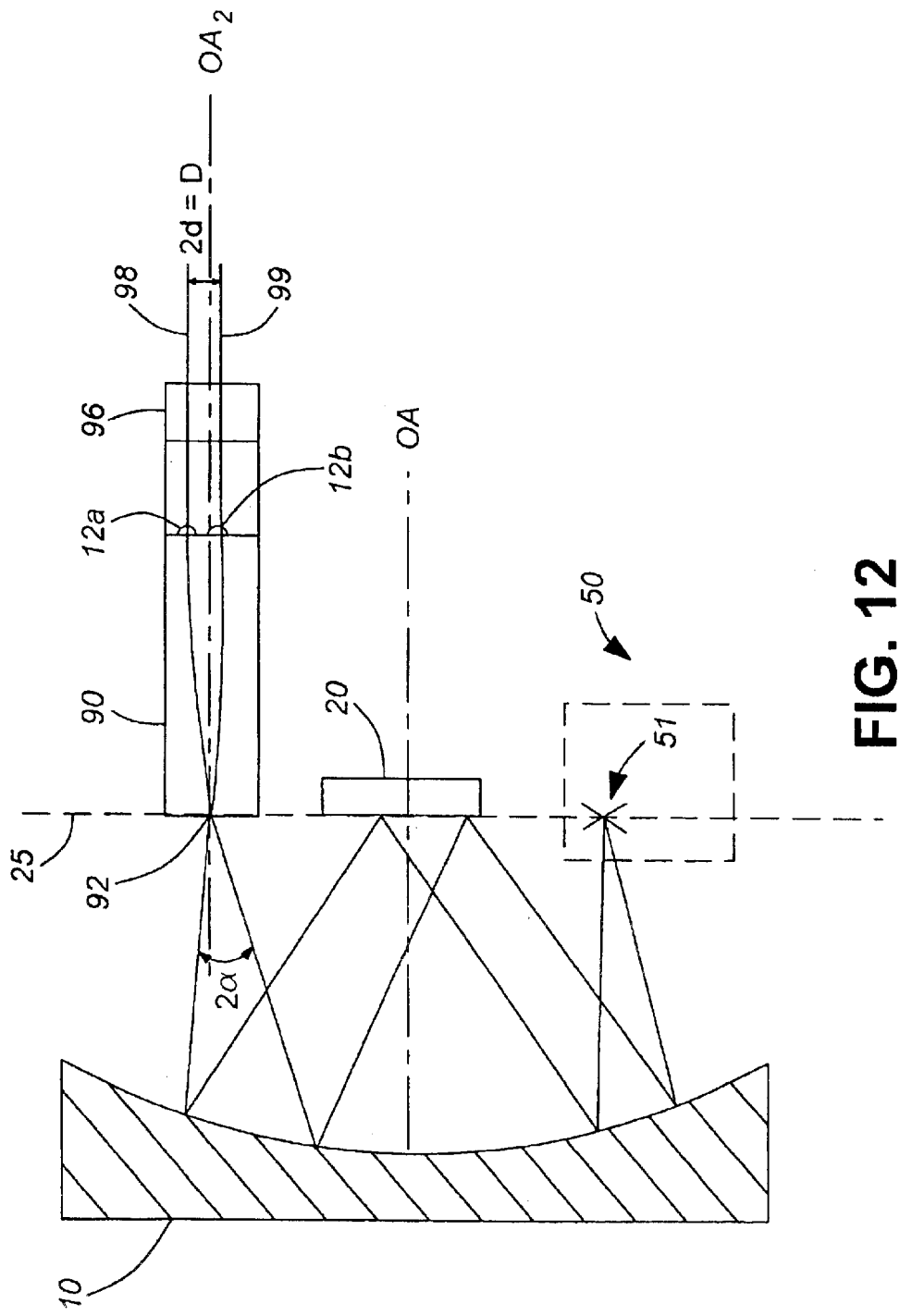
FIG. 12 is a schematic diagram of a COADM in accordance with the instant invention, wherein an asymmetric arrangement of the input/output optical waveguides complements the angular displacement provided by a MEMS element.

Of course, numerous other embodiments may be envisaged, without departing from the spirit and scope of the invention. For example, in practice it is preferred that each reflector of the MEMS array is deflected between positions non-parallel to focal plane 25 i.e., the deflection is not equivalent to the 45° and 0° deflections illustrated heretofore. In these instances, it is preferred that the optical waveguides coupled to the lens 90 be asymmetrically disposed about the optical axis OA$_2$, as illustrated in FIG. 9d. For example, FIG. 12 illustrates how strategic placement of the optical waveguides 99 and 98 can complement the angular displacement provided by the MEMS reflector 51. Moreover, it is also within the scope of the instant invention for the MEMs array to flip in either a horizontal or vertical direction, relative to the dispersion plane. Furthermore, any combination of the above embodiments and/or components are possible.

Referring again to FIG. 3a, the modifying means 150 is shown including a liquid crystal array 130, a polarization beam splitter 144, and a reflector 146 for redirecting an optical signal transmitted through the liquid crystal array back to the liquid crystal array. Advantageously, this double pass system provides a novel arrangement that significantly improves the extinction ratio and/or reduces cross-talk when the device is operating as a COADM.

Figure 13:
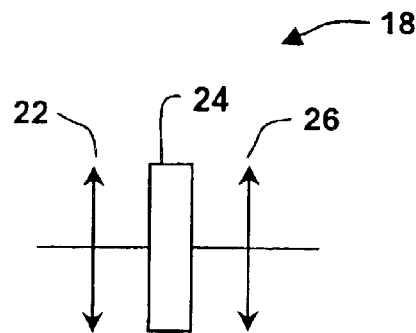
FIG. 13 is a schematic diagram of a prior art attenuator.
Figure 14:
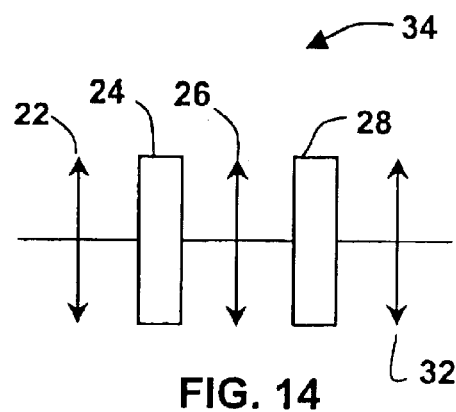
FIG. 14 is a schematic diagram of a variable optical attenuator including two liquid crystal stages.

For example, compare the prior art liquid crystal based light attenuator shown in FIG. 13 to the dual liquid crystal device shown in FIG. 14. In FIG. 13, the attenuator 18 includes a first polarizer 22, a liquid crystal cell 24, and a second polarizer (analyzer) 26. The first polarizer 22 and analyzer 26 are shown having parallel transmission axes. The liquid crystal cell 24 modifies the polarization state of the polarized light transmitted from the first polarizer 22 to achieve variable attenuation at the analyzer 26. For example, when the liquid crystal cell 24 is in an "ON" state, the polarized light transmitted from the first polarizer 22 is not rotated, the analyzer 26 passes all of the light transmitted from the liquid crystal cell 24, and there is no attenuation of optical signal. When the liquid crystal cell 24 is in an "OFF" state, the polarized light transmitted from the first polarizer 22 is rotated by 90 degrees, the analyzer 26 blocks all of the light transmitted from the liquid crystal cell 24, and full attenuation of optical signal should be achieved. However, in practice full attenuation is not achieved due to imperfect and/or incomplete polarization rotation performed by the liquid crystal cell 24. For example, imperfections in the liquid crystal cell result in some portions of a beam of light transmitted therethrough being rotated less than 90 degrees. This results in an unacceptably low extinction ratio (i.e., which is a measure of the maximum value in attenuation attainable in variable optical attenuation) when the liquid crystal cell is used in a variable attenuator and/or incomplete channel switching or cross-talk when the liquid crystal cell is used in a COADM or switch.

In FIG. 14, a variable attenuator having an improved extinction ratio is provided. The attenuator 34 is similar to the attenuator shown in FIG. 13, but further includes a second liquid crystal cell 28 and third polarizer 32. The first polarizer 22, the second polarizer 26, and the analyzer 32 are depicted having transmission axes parallel to one another. When both liquid crystal cells 24, 28 are in an "ON" state, the attenuator provides substantially no attenuation. For example, polarized light transmitted from the first polarizer 22 is transmitted through the first liquid crystal cell 24 where it is not rotated, is passed through the second polarizer 26 where there is no attenuation, is passed through the second liquid crystal cell 28 where it is not rotated, and is passed through the third analyzer 32 where there is no attenuation. In contrast, when both liquid crystal cells 24, 28 are in an "OFF" state there is substantially full attenuation. For example, most of the polarized light transmitted from the first polarizer 22 is rotated by 90 degrees by the first liquid crystal cell 24 and is blocked by the second polarizer 26. The small portion of polarized light that was not rotated by 90 degrees by the first liquid crystal cell 24 passes through the second polarizer 26 and has its polarization rotated by 90 degrees by the second liquid crystal cell 28. The light rotated by 90 degrees by the second liquid crystal cell is then blocked by the analyzer 32. Advantageously, in addition blocking substantially all of the light, and thus increasing the extinction ratio and dynamic range of the attenuator.

Figure 15:
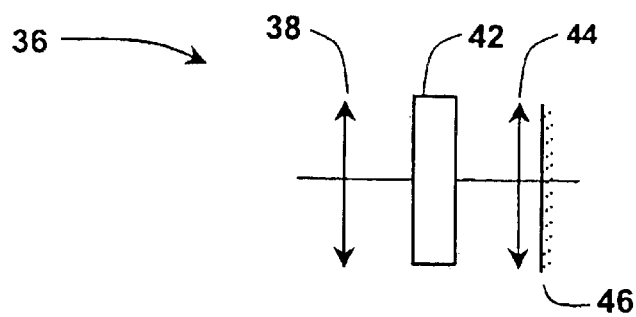
FIG. 15 is a schematic diagram of a reflective variable optical attenuator in accordance with an embodiment of the invention exhibiting an increase extinction ratio.

Referring to FIG. 15, there is shown a folded version of the optical attenuator depicted in FIG. 14. The attenuator 36 includes an input polarizer 38, a liquid crystal cell 42, a polarizer 44, and a reflector 46. The input polarizer/analyzer 38 and second polarizer 44 are shown having parallel transmission axes. The operation of the attenuator 36 shown in FIG. 15 is similar to the operation of the attenuator shown in FIG. 14. When the liquid crystal cell 42 is in an "ON" state the attenuator 36 provides substantially no attenuation. For example, polarized light transmitted from the first polarizer 38 is transmitted through the liquid crystal cell 42 where it is not rotated, is passed through the second polarizer 44 where there is no attenuation, and is transmitted to the reflector 46. The reflected light is passed back through the second polarizer 44, and is transmitted through the liquid crystal cell 42 where it is not rotated, and is passed through the first polarizer (analyzer) 32 with substantially no attenuation. In contrast, when the liquid crystal cell 42 is in an "OFF" state there is substantially full attenuation. For example, in the first pass most of the polarized light transmitted from the first polarizer 38 is rotated by 90 degrees by the liquid crystal cell 42 and is blocked by the analyzer 44. The small portion of light having a component parallel to the input polarized light is transmitted through the analyzer 44, and is reflected from the reflector 46 to pass through the optics a second time. In the second pass, the residual light is passed back through the polarizer 44 to the liquid crystal cell 42, where its polarization is rotated by 90 degrees, and is substantially blocked by the input polarizer (analyzer) 38.

Thus, in addition to increasing the total attenuation range as discussed above, this arrangement advantageously uses a same liquid crystal cell and a same input polarizer for both passes, thus reducing the number of components. Furthermore, since the optical signal passes through the same region of the liquid crystal cell during both passes, polarization dependent loss (PDL) is minimized.

Notably, the double pass arrangement shown in FIG. 15 is analogous to the modifying means shown in FIGS. 3a–d, where the polarized input light is provided by one of the polarization diversity units 105/105b shown in FIGS. 2a–b, rather than a dichroic polarizer, the liquid crystal cell is part of an array 130, a polarization beamsplitter 144 is the second polarizer, and a flat reflector 142 is the reflector., In fact, in many applications a polarization diversity unit, such as the one shown in FIGS. 2a–b, is preferable to a dichroic polarizer for use as the input polarizer because of a lower insertion loss. In these applications, each of the two sub-beams of light having orthogonal polarizations (or the same polarization if at least one is passed through a half-wave plate) passes through a same or different liquid crystal cell.

In the double pass optical attenuator shown in FIG. 15, it is advantageous for the input light to be substantially focussed on the liquid crystal cell such that a continuous and compact array of liquid crystal cells is possible. Moreover, an increased channel bandwidth is observed if the beam waist is focussed on the liquid crystal cell. However, if light is focussed on the liquid crystal cell for the first pass through the device, it will diverge when it passes through the liquid crystal cell during the second pass. In one embodiment, this divergence is eliminated by providing relay or re-imaging optics between the liquid crystal cell 42 and the backreflector 46. In another embodiment, this divergence is reduced by focussing the light on the backreflector 46 and minimizing the distance between the liquid crystal cell 42 and the backreflector 46, thus allowing the light to be almost focussed at the liquid crystal cell 42. Alternatively, the beam waist is focused at an intermediate position between the liquid crystal cell 42 and the back reflector 46. However, in either instance undesirable multi-path interference effects occur between parallel surfaces of the optical components. Accordingly, the polarizer 44 is optionally provided with an anti-reflection coating. In addition, the backreflector 46 is optionally provided at an angle to the parallel surfaces of the liquid crystal cell 42 to eliminate the interference effects. For example, in one embodiment the backreflector 46 is designed with a wedge shape.

Figure 16A:
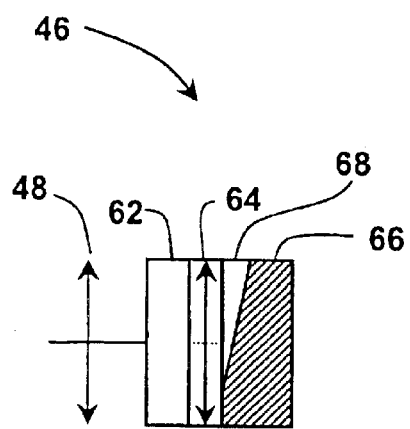
FIG. 16a is a schematic diagram of a reflective variable optical attenuator in accordance with an embodiment of the invention having a wedged backreflector.

Referring to FIG. 16a, there is shown an optical attenuator similar to that depicted in FIG. 15 having a wedged backreflector. The attenuator 46 includes an input polarizer 48, a liquid crystal cell 62, a polarizer 64, and the wedged backreflector 66. In particular, the backreflector is wedged such that the reflective surface thereof is at a small angle to a substrate of the liquid crystal cell 62 and/or polarizer 64. The angle is selected to be large enough to eliminate unwanted reflections off the liquid crystal cell 62, and small enough not to diverge the primary beam to a significant extent. For example, in one embodiment the angle is in a range from about 0.1 degrees to about 12 degrees. Optionally, a glass spacer 68 is provided between the wedged backreflector 66 and the polarizer 64 to allow adhesion of the backreflector to the polarizer. Preferably, the glass spacer has a refractive index and/or a coefficient of thermal expansion selected to match the respective refractive index and/or coefficient of thermal expansion of the substrate in the liquid crystal cell and/or the polarizer 64. The operation of the attenuator shown in FIG. 16a is the same as the operation of the attenuator shown in FIG. 15.

Figure 16B:
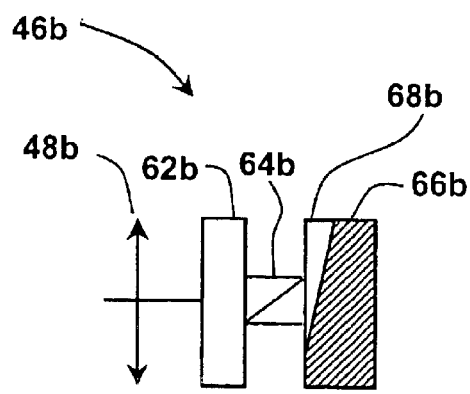
FIG. 16b is a schematic diagram of a reflective variable optical attenuator in accordance with another embodiment of the invention having a wedged backreflector.

Referring to FIG. 16b, there is shown an optical attenuator similar to that depicted in FIG. 16a having a wedged backreflector, wherein the second polarizer is substituted with a polarization beamsplitter 64b. The attenuator 46b includes an input polarizer 48b, a liquid crystal cell 62b, a polarization beamsplitter 64b, and the wedged backreflector 66b. In particular, the backreflector 66b is wedged such that the reflective surface thereof is at a small angle to a substrate of the liquid crystal cell 62b and/or polarizer 64b. The angle is selected to be large enough to eliminate unwanted reflections off the liquid crystal cell 62b, and small enough not to diverge the primary beam to a significant extent. For example, in one embodiment the angle is in a range from about 0.1 degrees to about 12 degrees. Optionally, a glass spacer 68b is provided between the wedged backreflector 66b and the polarizer 64b to allow adhesion of the backreflector to the polarizer. Preferably, the glass spacer has a refractive index and/or a coefficient of thermal expansion selected to match the respective refractive index and/or coefficient of thermal expansion of the substrate in the liquid crystal cell and/or the polarizer 64k. The operation of the attenuator shown in FIG. 16b is the same as the operation of the attenuator shown in FIG. 15, with the exception that the polarization beamsplitter 64b diverts the light rotated by 90 degrees by the liquid crystal cell 62b in another direction, rather than blocking it. For example, the diverted light is optionally lost or directed to a different output port.

Referring to FIG. 17, there is shown an optical attenuator similar to that depicted in FIG. 16a having a wedged polarizer. The attenuator 70 includes an input polarizer (analyzer) 72, a liquid crystal cell 74, a wedged polarizer 76, and a backreflector 78. In particular, the polarizer is wedged such that the reflective surface of the backreflector 78 is at a small angle to a substrate of the liquid crystal cell 74. For example, in one embodiment the polarizer 76 is contacted to the backreflector 78 and the assembly is polished until a portion of the polarizer is removed, and possibly some of the backreflector. It is preferred that only the thin wedged part of the polarizer is used in these instances. In general, the angle is selected to be large enough to eliminate unwanted reflections off the liquid crystal cell 74, and small enough not to diverge the primary beam to a significant extent. For example, in one embodiment the angle is in a range from about 0.1 degrees to about 12 degrees. Preferably, the polarizer 76 is coated with an anti-reflection coating. The operation of the attenuator shown in FIG. 17 is the same as the operation of the attenuator shown in FIG. 15.

Referring to FIG. 18a, there is shown an optical attenuator in accordance with another embodiment of the instant invention. The attenuator 79 includes an input polarizer (analyzer) 81, a liquid crystal cell 82, a birefringent wedge 84, and a reflector 86. The birefringent wedge 84 is oriented and cut/polished such that light transmitted from the liquid crystal cell 82 having a first polarization is reflected by the reflector 86 back along a predetermined desired path, whereas light having a polarization orthogonal to the first polarization is deflected by reflector 86 birefringent wedge 84 along a different path. The operation of the attenuator is described as follows. When the liquid crystal cell 82 is in an "ON" state the attenuator 80 provides substantially no attenuation. For example, polarized light transmitted from the input polarizer 81 is transmitted through the liquid crystal cell 82 where it is not rotated, is passed through the birefringent wedge 84, and is transmitted to the reflector 86. The reflector 86 reflects the light back through the birefringent wedge 84, where it is reflected at a predetermined angle back to the liquid crystal cell 82 and passed back through the input polarizer 81. In contrast, when the liquid crystal cell 42 is in an "OFF" state there is substantially full attenuation.

For example, in the first pass most of the polarized light transmitted from the first polarizer 38 is rotated by 90 degrees by the liquid crystal cell 42, is passed through the birefringent wedge 84, and is transmitted to the reflector 86. The reflector 86 reflects the light back through the birefringent wedge 84, where it deflected at a different predetermined angle, such that it is not received at the input/output port, thus providing substantially full attenuation. The small portion of the polarized light that is was not fully rotated by 90 degrees by the liquid crystal cell 82 is passed through the liquid crystal cell 82, where its polarization is rotated by 90 degrees, and is blocked by the input polarizer (analyzer) 81. In other words, the birefringent wedge reflects light having one polarization back along a substantially same optical path such that it is picked up by the system, and deflects the other polarization along a different optical path such that it is not picked up by the system.

Referring to FIG. 18b, a schematic diagram of a single birefringent wedge having a reflective coating illustrates the function of the birefringent wedge. In FIG. 18b, the o-beam (polarized along the ordinary axis of the birefringent wedge) is reflected exactly backwards, while the e-beam (polarized along the extra-ordinary axis of the birefringent wedge) is deflected downwards.

In each of the embodiments shown in FIGS. 15, 16a,b, 17, and 18a, the second polarizer (i.e., including the polarization beamsplitter and birefringent wedge) and/or backreflector is optionally made to be part of the liquid crystal cell. For example, in one embodiment one substrate of the liquid crystal cell is made of a polarizer material. Furthermore, in each of the embodiments shown in FIGS. 15, 16a,b, 17, and 18a, the input polarizer is optionally replaced with a polarization diversity unit 105/105b, such as that shown in FIGS. 2a–b; or a polarization beamsplitter.

Figure 19A:
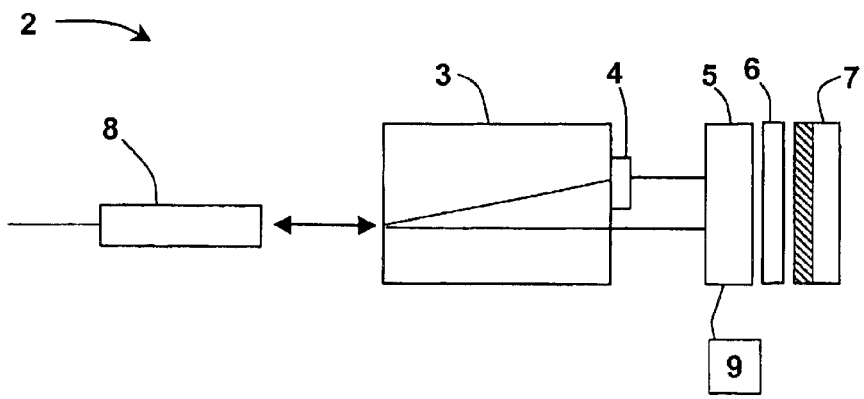
FIG. 19a is a schematic diagram of a reflective variable optical attenuator in accordance with another embodiment of the invention including a birefringent wedge, wherein the device is in an "ON" state.
Figure 19B:
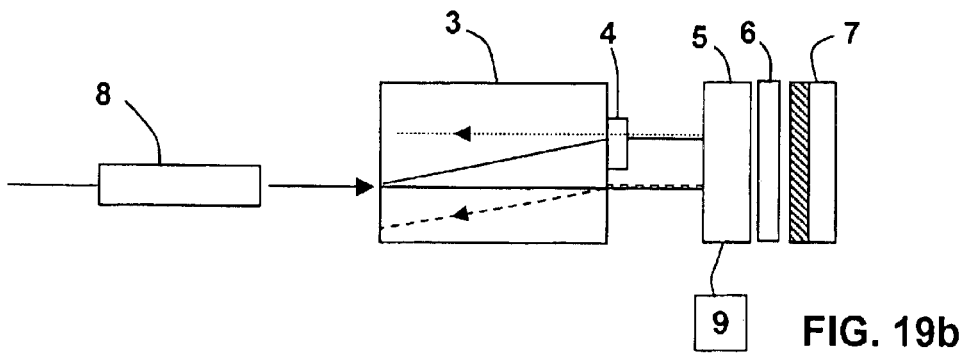
FIG. 19b is a schematic diagram of a reflective variable optical attenuator in FIG. 19a, wherein the device is in an "OFF" state.

For example, consider the optical attenuator illustrated in FIGS. 19a–b. The attenuator 2 includes an input optical waveguide, such as optical fibre 8, a birefringent crystal 3, half-wave plate 4, a liquid crystal cell 5, a polarizer 6, and a reflector 7. In operation, an input beam of light launched from optical fibre 8 is incident on a first end of the birefringent crystal 3. The birefringent crystal 3 spatially separates the input beam of light into two sub-beams of light having orthogonal polarization states. The half-wave plate 4 rotates the polarization of one sub-beam of light such that both have the same polarization state. Both sub-beams of light pass through the liquid crystal cell 5, where their polarizations are selectively changed. A controller 9, which is coupled to the liquid crystal cell 5, operates to selectively cause the liquid crystal cell 5 to switch between an "ON" state, an "OFF" state, and various intermediate states, in dependence upon a desired attenuation level. When the liquid crystal cell 5 is in an "ON" state, as shown in FIG. 19a, both sub-beams of light are transmitted through the liquid crystal cell with substantially no change to their polarization states, are transmitted through the polarizer 6, and are reflected by the reflector 7 back along a substantially same path to the birefringent crystal 3 where they are combined to produce an output signal with substantially no attenuation. When the liquid crystal cell 5 is in an "OFF" state, as shown in FIG. 19b, the liquid crystal rotates the polarization of two sub-beams of light by 90 degrees, such that they are substantially blocked by the polarizer 6. A small portion of the optical signal that is not blocked is retroreflected back through the liquid crystal cell 5 as two residual sub-beams of light, where their polarizations are rotated by 90 degrees such that they impinge the birefringent crystal 3 with polarization states orthogonal with respect to the polarization states of the first pass through the birefringent crystal 3. Accordingly, they exit at locations not coincident with the input/output waveguide. Notably, the birefringent crystal 3 and half-wave plate 4 together function as a polarizer, or as the output analyser, in that only light having a predetermined polarization is transmitted therefrom to the liquid crystal cell 5, and only light having the same predetermined polarization is transmitted therefrom to the input/output fibre 8.

Figure 20:
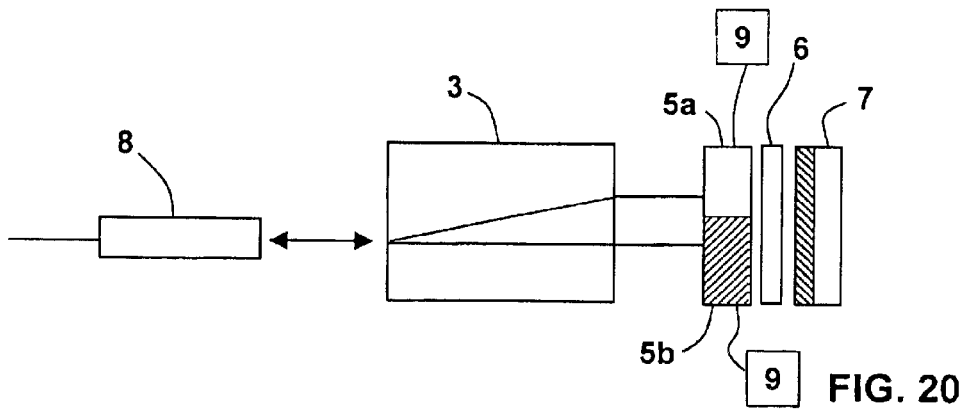
FIG. 20 is a schematic diagram of a reflective variable optical attenuator in accordance with yet another embodiment of the invention.

In the embodiment shown in FIGS. 19a–b, each sub-beam of light is passed through a single liquid crystal cell. However, it is also within the scope of the instant invention to pass each sub-beam of light through a different liquid cell. These liquid crystal cells may be either both in an "ON" or an "OFF" state, or alternatively, are in opposite states. Preferably, each cell corresponds to a different pixel (e.g., independently addressable element) of a liquid crystal array. FIG. 20 illustrates an embodiment of the instant invention similar to that shown in FIGS. 19a–b, wherein the polarization diversity unit shown in FIGS. 19a–b, does not include a half-wave plate 4, and wherein each of the two sub-beams of light passes through a different one of a complementary pair of liquid crystal cells 5a and 5b, i.e., when one is turned off the other is turned on.

Figure 21:
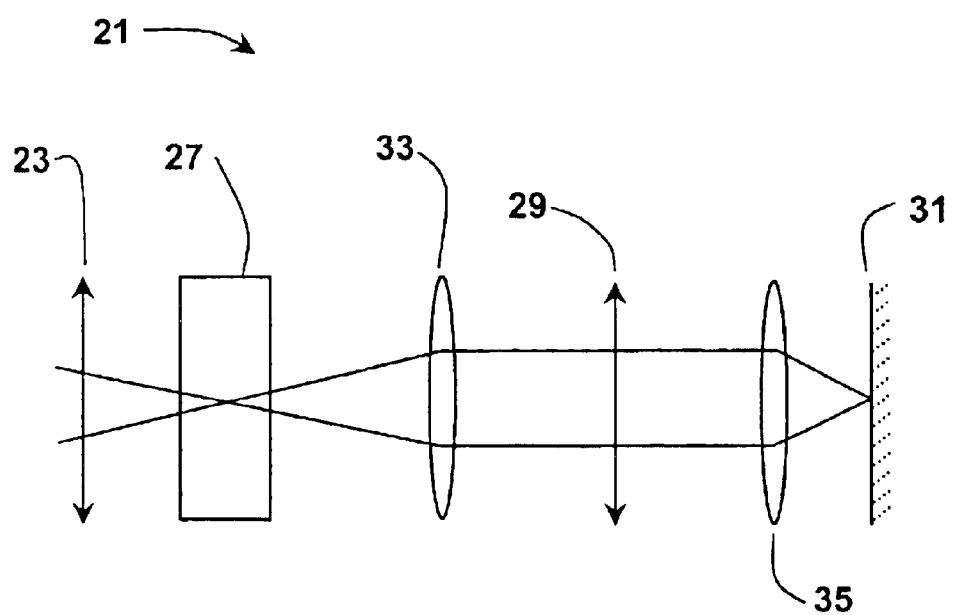
FIG. 21 is a schematic diagram of a reflective variable optical attenuator in accordance with another embodiment of the invention including a 4-f imaging system.

FIG. 21 illustrates yet another embodiment of an optical attenuator in accordance with the instant invention. The attenuator 21 includes an input polarizer 23, a liquid crystal modulator 27, a polarizer 29, and a reflector 31. The attenuator 21 further includes first 33 and second 35 relay, or re-imagining, lenses that form a 4-f system. In particular, the front focal point of the first lens 33 is coincident with the liquid crystal modulator 27m the back focal point of the first lens 33 is coincident with the front focal point of the second lens 35, and the back focal point of the second lens 35 is coincident with the backreflector 31. The description of the operation of the attenuator shown in FIG. 21 is the same to the operation of the attenuator shown in FIG. 15, with the exception that the re-imaging optics 33, 35 provide focussing and collimating such that all light incident on the liquid crystal cell 27 and reflector 31 is focussed light, as discussed above. Notably, the second polarizer 29 is shown between the first 33 and second 35 lenses for illustration purposes only. In alternative embodiments, the polarizer 29 is disposed between the liquid crystal cell 27 and the first lens 33, or between the second lens 35 and the backreflector 31.

In each of the embodiments shown in FIGS. 14, 15, 16a, 17, and 21 the first polarizer/analyzer and second polarizer are described as having parallel transmission axes, such that the "ON" state of the liquid crystal cell corresponds to substantially no attenuation. Alternatively, the polarizer and analyzer are oriented to have perpendicular transmission axes, such that the "ON" state corresponds to substantially total attenuation. Notably, in each of the above embodiments the "ON" state of the liquid crystal cell is defined as when the liquid crystal cell does not rotate the polarization of light by 90 degrees for illustrative purposes only. It is also within the scope of the instant invention to use liquid crystal cells/arrays where the "ON" state is defined as when the liquid crystal cell rotates the polarization of light by 90 degrees.

Of course, each of the embodiments shown in FIGS. 15, 16a,b, 17, 18a, 19, 20 and 21 are suitable for use as modifying means as described heretofore. Furthermore, each of the embodiments shown in FIGS. 15, 16a,b, 17, 18a, 19, 20, and 21 is discussed with respect to variable optical attenuators for illustration purposes only. These embodiments are also suitable for use in DGE and COADM (or switch) applications.

Numerous other embodiments may be envisaged, without departing from the spirit and scope of the invention.

What is claimed is:

1. An optical device comprising:
    a first optical fibre for providing an input beam of light;
    first polarizing means for producing light having a predetermined polarization state from the input beam of light;
    a liquid crystal modulator positioned to receive the light having a predetermined polarization state and for selectively altering its polarization;
    second polarizing means positioned to receive the light transmitted from the liquid crystal modulator, said second polarization means designed for passing light having one of the predetermined polarization and a polarization perpendicular to the predetermined polarization and for blocking or diverting the other;
    a reflective surface positioned to receive the light passed through the second polarizing means and reflect it for a second pass through the liquid crystal modulator; and
    a controller coupled to the liquid crystal modulator to direct the selective altering of polarization in dependence upon a desired attenuation setting for light exiting the optical device through one of the first optical fibre and a second optical fibre.

2. An optical device according to claim 1, wherein the first polarizing means comprises one of a polarizer, a dichroic polarizer, a polarization beamsplitter, and a birefringent crystal.

3. An optical device according to claim 1, wherein the second polarizing means comprises one of a polarizer, a dichroic polarizer, polarization beam splitter, a birefringent crystal, a pair of coupled polarization beam splitters, and a double Glan prism.

4. An optical device according to claim 2, wherein the second polarizing means comprises one of a polarizer, a dichroic polarizer, a polarization beam splitter, a birefringent crystal, a pair of coupled polarization beam splitters, and a double Glan prism.

5. An optical device according to claim 1, wherein the first polarizing means comprises a birefringent crystal for separating the input beam of light into two sub-beams of light having orthogonal polarizations.

6. An optical device according to claim 5, wherein the second polarizing means comprises a dichroic polarizer.

7. An optical device as defined in claim 6, wherein the polarizer has a dichroic axis aligned either parallel or orthogonal to a walk-off direction of the birefringent crystal.

8. An optical device as defined in claim 5, wherein the second polarizing means comprises a polarization beamsplitter.

9. An optical device as defined in claim 5, wherein the two-sub beams of light pass through one of a same addressable region of the liquid crystal modulator and different addressable regions of the liquid crystal modulator.

10. An optical device as defined in claim 5, comprising a half waveplate disposed between the birefringent element and the liquid crystal modulator for rotating the polarization of at least one of the two orthogonally polarized beams such that both have a same polarization at the liquid crystal modulator.

11. An optical device according to claim 1, wherein the reflective surface is angled relative to a surface of the liquid crystal modulator.

12. An optical device according to claim 11, wherein the reflective surface comprises a wedged mirror.

13. An optical device according to claim 11, comprising a wedged glass spacer disposed between the reflective surface and the second polarizing means.

14. An optical device according to claim 11, wherein the second polarizing means comprises one of a dichroic polarizer, a wedged dichroic polarizer and a birefringent wedge.

15. An optical device according to claim 13, wherein the wedged glass spacer is part of the liquid crystal modulator.

16. An optical device according to claim 14, wherein the second polarizing means is part of the liquid crystal modulator.

17. An optical device according to claim 16, wherein the reflective surface is part of the liquid crystal modulator.

18. An optical device according to claim 1, where the liquid crystal modulator comprises a liquid crystal array having a plurality of independently addressable regions.

19. An optical device according to claim 1, further comprising a first lens and a second lens optically disposed between the liquid crystal modulator and the reflective surface, the first and second lenses positioned to provide focussed light on the liquid crystal modulator and the reflective surface.

20. An optical device as defined in claim 1, wherein the input beam of light passes through a same overlapping region in the liquid crystal modulator for both a first and the second pass therethrough.

21. An optical device according to claim 1, comprising a plurality of fibres, each fibre for producing an input optical signal that is transmitted through a separate region of the liquid crystal modulator.

22. An optical device according to claim 1, wherein the second polarizing means comprises first and second polarization beamsplitters arranged such that light launched from the liquid crystal modulator having a first polarization state is reflected from the first polarization beamsplitter to the second polarization beam splitter and back to the liquid crystal modulator, while light having a second orthogonal polarization state passes through the first polarization beamsplitter and is reflected off the reflective surface and back to the liquid crystal modulator.

23. An optical device according to claim 1, comprising a dispersive element optically disposed between the first polarizing means and the liquid crystal modulator for spatially separating the light having a predetermined polarization state such that individual wavelength channels are incident on different addressable regions of the liquid crystal modulator to allow for wavelength selective attenuation or switching.

24. An optical device according to claim 23, wherein the dispersive element is a diffraction grating.

25. An optical device according to claim 1, wherein the liquid crystal modulator comprises twisted nematic liquid crystal.

26. An optical device according to claim 1, wherein the device is one of a variable optical attenuator, a DGE, and a COADM.

27. An optical device comprising:
    an optical fibre for launching an input optical signal;
    a first polarizer disposed for receiving the input optical signal and for producing polarized light therefrom;
    a liquid crystal modulator disposed for selectively altering the polarization of the polarized light, at least one region of the liquid crystal modulator operable between a first state where the polarization of light transmitted therethrough is not rotated and a second state where the polarization of light transmitted therethrough is rotated by degrees;

a second polarizer disposed for passing light transmitted from the liquid crystal modulator in dependence upon its polarization state; and a reflective element disposed for reflecting the light transmitted from the second polarizer back towards the optical fibre via the second polarizer, the liquid crystal modulator, and the first polarizer to provide an improved extinction ratio for one of the first and second states.

28. A variable optical attenuator comprising:

a birefringent element positioned to separate the optical signal into two spatially separated, orthogonally polarized beams;

a liquid crystal modulator positioned to receive the polarized beams of light and to selectively alter their polarizations;

a reflective element positioned to reflect the polarized beams back through the liquid crystal modulator and the birefringent element, wherein the birefringent element recombines orthogonally polarized components of the reflected beams to produce an output optical signal; and a polarizer optically disposed between the liquid crystal array and the reflective element, wherein the polarizer is positioned to contact the beams during at least one of a first pass from the liquid crystal modulator to the reflective element and a second pass from the reflective element back to the modulator.

29. A variable optical attenuator as defined in claim 28, wherein the polarizer is positioned to contact the beams during both passes.

30. A variable optical attenuator as defined in claim 29, wherein the polarizer is a dichroic polarizer.

* * * * *